United States Patent
Nimbalker et al.

(10) Patent No.: US 12,133,099 B2
(45) Date of Patent: Oct. 29, 2024

(54) TECHNIQUE FOR HANDLING CONTROL CHANNELS ON COMPONENT CARRIERS

(71) Applicant: Telefonaktiebolaget LM Ericsson (publ), Stockholm (SE)

(72) Inventors: Ajit Nimbalker, Fremont, CA (US); Ravikiran Nory, San Jose, CA (US); Xingqin Lin, Santa Clara, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 534 days.

(21) Appl. No.: 17/430,363

(22) PCT Filed: Feb. 11, 2020

(86) PCT No.: PCT/EP2020/053446
§ 371 (c)(1),
(2) Date: Aug. 12, 2021

(87) PCT Pub. No.: WO2020/165156
PCT Pub. Date: Aug. 20, 2020

(65) Prior Publication Data
US 2022/0150734 A1 May 12, 2022

Related U.S. Application Data

(60) Provisional application No. 62/805,681, filed on Feb. 14, 2019.

(51) Int. Cl.
*H04W 24/08* (2009.01)
*H04L 1/00* (2006.01)
(Continued)

(52) U.S. Cl.
CPC .......... *H04W 24/08* (2013.01); *H04L 1/0038* (2013.01); *H04L 5/001* (2013.01); *H04W 72/0453* (2013.01); *H04W 72/23* (2023.01)

(58) Field of Classification Search
CPC . H04W 24/08; H04W 72/23; H04W 72/0453; H04L 1/0038; H04L 5/001
See application file for complete search history.

(56) References Cited

U.S. PATENT DOCUMENTS

2016/0270047 A1* 9/2016 Kazmi ................. H04L 5/0005
2020/0112919 A1* 4/2020 Nam .................... H04B 7/0617
(Continued)

OTHER PUBLICATIONS

"3GPP TS 38.306 V15.4.0", 3rd Generation Partnership Project; Technical Specification Group Radio Access Network; NR; User Equipment (UE) radio access capabilities (Release 15), Dec. 2018, pp. 1-40.
(Continued)

*Primary Examiner* — Ajay Cattungal
(74) *Attorney, Agent, or Firm* — Murphy, Bilak & Homiller, PLLC

(57) ABSTRACT

Herein, techniques for monitoring (304) and transmitting control channels on component carriers, CCs, in at least two frequency ranges, FRs, between a radio device and a base station are described. As to a method aspect of the technique, a transmission (302) of radio parameters that are, for each of the at least two FRs, indicative of the radio device's capability of monitoring a number of control channels on each of the CCs at the radio device is performed. Monitoring (304), in each of the at least two FRs, the number of control channels on each of the CCs according to the indicated capability is subsequently performed.

26 Claims, 10 Drawing Sheets

400

Receive, from a radio device, radio parameters that are, for each of at least two FRs, indicative of the radio device's capability of monitoring a number of control channels on each CC in the at least two FRs — 402

Transmit control information to the radio device in each of the at least two FRs using the number of control channels on each CC according to the indicated capability. — 404

(51) Int. Cl.
*H04L 5/00* (2006.01)
*H04W 72/0453* (2023.01)
*H04W 72/23* (2023.01)

(56) References Cited

U.S. PATENT DOCUMENTS

| | | | |
|---|---|---|---|
| 2020/0229103 A1* | 7/2020 | Hosseini | H04W 52/34 |
| 2021/0227418 A1* | 7/2021 | Hwang | H04W 72/0446 |
| 2022/0116969 A1* | 4/2022 | He | H04L 5/0091 |
| 2022/0150734 A1* | 5/2022 | Nimbalker | H04L 5/0091 |
| 2023/0024647 A1* | 1/2023 | Kuang | H04L 5/001 |

OTHER PUBLICATIONS

"3GPP TS 38.213 V15.4.0", 3rd Generation Partnership Project; Technical Specification Group Radio Access Network; NR; Physical layer procedures for control (Release 15), Dec. 2018, pp. 1-104.

"3GPP TS 38.331 V15.4.0", 3rd Generation Partnership Project; Technical Specification Group Radio Access Network; NR; Radio Resource Control (RRC) protocol specification (Release 15), Dec. 2018, pp. 1-474.

"Maintenance for physical downlink control channel", 3GPP TSG RAN WG1 Meeting #94, R1-1809426, Gothenburg, Sweden, Aug. 20-24, 2018, pp. 1-15.

"PDCCH blind decoding capability coordination in NR-DC", 3GPP TSG-RAN WG2 Meeting #104, R2-1818302, Spokane, US, Nov. 12-16, 2018, pp. 1-2.

"Remaining issues on PDCCH search space and blind decoding", 3GPP TSG RAN WG1 Meeting AH 1801, R1-1800196, Vancouver, Canada, Jan. 22-26, 2018, pp. 1-6.

"[Q015/Q016]: Handling of FDD/TDD and FR1/FR2 capability differences", 3GPP TSG-RAN WG2 #103 meeting, R2-1811134, Gothenburg, Sweden, Aug. 20-24, 2018, pp. 1-8.

"Discussion on NR CA for cross-carrier scheduling with different numerologies", 3GPP TSG RAN WG1 Ad-Hoc Meeting 1901, R1-1900067, Taipei, Jan. 21-25, 2019, pp. 1-11.

"Remaining issues on control resource set and search space", 3GPP TSG RAN WG1 Meeting #93, R1-1807353, Busan, Korea, May 21-25, 2018, pp. 1-11.

* cited by examiner

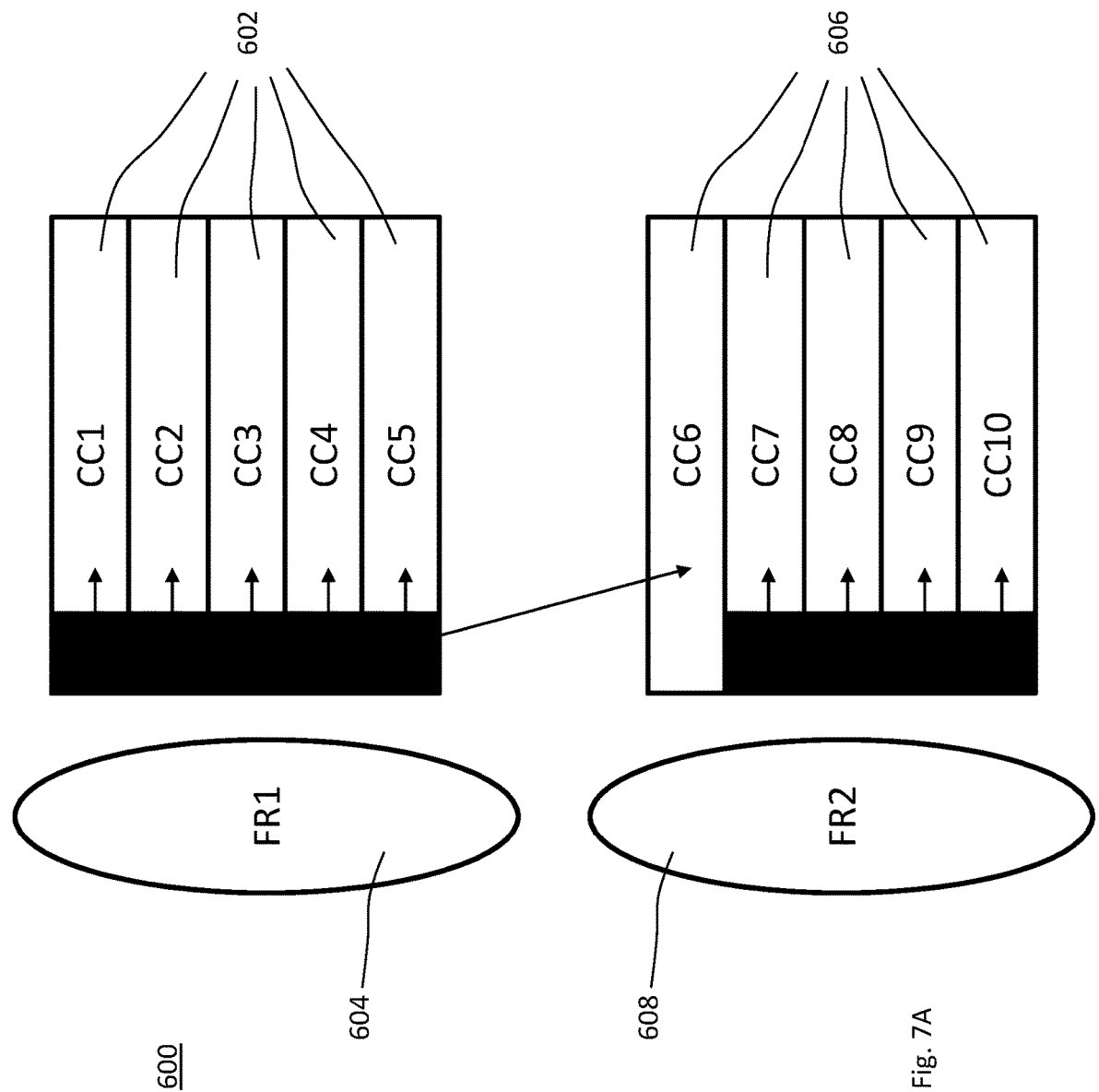

800

900

TECHNIQUE FOR HANDLING CONTROL CHANNELS ON COMPONENT CARRIERS

TECHNICAL FIELD

The present disclosure relates to handling control channels on component carriers. More specifically, and without limitation, methods and devices for monitoring and transmitting control channels on component carriers are provided.

BACKGROUND

New Radio (NR) is a radio access technology specified by the Third Generation Partnership Project (3GPP) to provide radio connectivity by means of one or more base stations (also referred to as a gNodeB or gNB) to a radio device (also referred to as user equipment or UE) for multiple use cases or services such as enhanced mobile broadband (eMBB), ultra-reliable and low latency communication (URLLC) and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the technical means for low latency data transmission comprises shorter transmission time intervals (TTIs). In NR, in addition to transmissions in a slot, a mini-slot transmission is also allowed to reduce latency. A mini-slot may consist of any number of 1 to 14 OFDM symbols. It should be noted that the concepts of slot and mini-slot are not specific to a specific service meaning that a mini-slot may be used for any of eMBB, URLLC, or other services.

A further means for high data rates comprises carrier aggregation (CA). For CA, the 3GPP document TS 38.213, version 15.4.0, specifies a partitioning technique for blind decoding (BD, also: blind detecting) of one or more control channel elements (CCEs) on a physical downlink control channel (PDCCH) on different carriers, i.e., the different component carriers (CCs, also referred to as cells) of the CA. This partitioning technique is based on a capability indicated by the UE, e.g., by means of the physical layer parameter pdcch-BlindDetectionCA.

However, the current technique for partitioning of PDCCH BD and CCE is unclear and can lead to inferior and/or inconsistent behavior of the UE when the gNB chooses to operate a UE with CA, which is configured with CA among CCs belonging to different frequency ranges, for example a frequency range below 6 GHz and a frequency range above 24 GHz.

SUMMARY

Accordingly, there is a need for a technique that handles component carriers in different frequency ranges.

As to a first method aspect, a method of monitoring control channels on component carriers (CCs) in at least two frequency ranges (FRs) at a radio device is provided. The method comprises or initiates a step of transmitting radio parameters that are, for each of the at least two FRs, indicative of the radio device's capability of monitoring a number of control channels on each of the CCs. The method further comprises or initiates a step of monitoring, in each of the at least two FRs, the number of control channels on each of the CCs according to the indicated capability.

In at least some embodiments, by transmitting radio parameters that are indicative of the radio device's capability of monitoring a number of control channels on each of the CCs, the correct number of control channels can be monitored in each of the at least two FRs based on to the capability indicated by the radio parameters.

The monitoring of the control channels may comprise Blind Decoding (BD) of physical downlink control channels (PDCCHs) on the CCs. The technique may be implemented as a method of handling a radio device capability of PDCCH BD, e.g., in a search space defined for 3GPP NR. Alternatively or in addition, the monitoring of the control channels may comprise monitoring control channel elements (CCEs) on the CCs. The technique may be implemented to handle the radio device capability of monitoring CCEs, e.g., in a search space defined for 3GPP NR.

The technique may be implemented to extend or specify a conventional partitioning technique, e.g., based on the 3GPP document TS 38.213, version 15.4.0. For example, the technique does not require that the radio device (e.g., a UE) reports only one capability without differentiation between frequency ranges. The radio parameters may be indicative of the capability of the radio device for the frequency ranges FR1 and FR2 of 3GPP NR.

The technique may enable the radio device, e.g., in extension of the 3GPP document TS 38.331, version 15.4.0, to transmit (e.g., to report) two capability values as the radio parameters, e.g., one for a first frequency range (e.g., FR1) and one for a second frequency range (e.g., FR2). The technique may be implemented for partitioning the monitoring of the control channels (e.g., PDCCH blind decoding, BD, and/or monitoring of CCEs) for different CCs in various cases of carrier aggregation with carriers amongst FR1 and FR2.

In same or further embodiments, the radio device (e.g., a UE) may transmit (e.g., reports) a capability for monitoring control channels (e.g., BD and/or monitoring CCEs) for FR1 in one of the radio parameters. The radio device (e.g., a UE) may further transmit (e.g., reports) a capability for monitoring control channels (e.g., for BD and/or monitoring CCE) for FR2 in another one of the radio parameters.

The partitioning of the monitoring of the control channels (e.g., BD and/or CCE) may be applied as follows. The capability (e.g., as to BD and/or monitoring CCEs) reported for FR1 may be applied for partitioning the monitoring of control channels (e.g., for partitioning BD and/or monitoring CCEs) to aggregated CCs in FR1 only. The capability (e.g., as to BD and/or monitoring CCEs) reported for FR2 may be applied for partitioning the monitoring of control channels (e.g., for partitioning BD and/or monitoring CCEs) to aggregated CCs in FR2 only.

Alternatively or in addition, the technique may be implemented for, or applied in the case of, cross-carrier scheduling, e.g., with mixed numerology amongst the aggregated CCs.

The number of control channels may be defined per slot and/or per CC (e.g., per serving cell) and/or per FR.

The radio parameter, e.g., Y, may correspond to a number of CCs the radio device is capable of monitoring, e.g., without carrier aggregation (CA) or in case the radio device is configured with one serving cell. The value of the radio parameter may be in the range of 4 to 16.

The radio device may transmit a radio parameter for each of the FRs.

The radio parameters may comprise a separate radio parameter for each of the FRs.

The number of control channels to be monitored on each of the CCs may be determined separately or independently for each of the FRs according to the indicated capability based on the radio parameter for the respective one of the FRs.

Radio parameters indicative of the radio device's capability of monitoring a number of control channels on each of the CCs may or may not require that the radio parameters are indicative of the number of control channels or that the radio parameters are indicative of the number of control channels for each of the CCs. Rather, the number of control channels (e.g., for each of the CCs) may be retrieved from a table based on the radio parameters and/or may be computed based on the radio parameters.

Each CC may correspond to a downlink cell and/or a serving cell. Alternatively or in addition, each CC may correspond to a scheduling cell or a scheduled cell, e.g., for cross-carrier scheduling. Particularly, the method may be a method of monitoring downlink cells in at least two FRs at a radio device. The method may comprise or initiate a step of transmitting radio parameters that are, for each of the at least two FRs, indicative of the radio device's capability of monitoring a number of downlink cells. The method may further comprise or initiate a step of monitoring the number of downlink cells in the at least two FRs according to the capability indicated in the transmitted radio parameters, e.g., depending on the capability indicated separately for each of the FRs.

The number of control channels monitored on each of the CCs according to the indicated capability may comprise a tabulated number of control channels for each of the CCs configured for the radio device if the number of configured CCs is equal to or less than a number of CCs indicated by the radio parameters for the respective FRs.

The radio device may be capable of monitoring a tabulated number of control channels on each of the CCs configured for the radio device, if the number of configured CCs is equal to or less than a number of CCs indicated by the radio parameters for the respective FRs.

The tabulated number may also be referred to as a non-carrier aggregation (non-CA) limit.

The tabulated number may depend on a numerology of the respective CC.

The number of control channels monitored on each of the CCs according to the indicated capability may comprise a partitioned number of control channels for each of the CCs configured for the radio device if the number of configured CCs is greater than a number of CCs indicated by the radio parameters for the respective FRs.

The radio device may be capable of monitoring the partitioned number of control channels on each of the CCs configured for the radio device, if the number of configured CCs is greater than a number of CCs indicated by the radio parameters for each of the FRs.

The partitioned number may be a function of at least one of the tabulated number for the respective CC and the number of CCs indicated by the radio parameters for the respective FR.

The partitioned number of control channels may be equal to or less than the tabulated number of control channels for each of the CCs.

The partitioned number may depend on the tabulated number for a given numerology multiplied by the ratio between the number of configured CCs for the given numerology and the number of all configured CCs.

The partitioned number, $N^{total,k,\mu}$, of control channels for each of the CCs with numerology $\mu$ in the FR k may be $$N^{total,k,\mu}=\text{floor}(Y^k \cdot N^{max,\mu} \cdot X^\mu/X).$$

wherein a number of configured CCs with numerology $\mu$ is $X^\mu$, the number of configured CCs is the sum $X=\Sigma_\mu X^\mu$, the number of CCs indicated by the radio parameters for the FR k is $Y^k$, and the tabulated number of control channels for each of the CCs with numerology $\mu$ is $N^{max,\mu}$.

The control channels may comprise candidates for a physical downlink control channel (PDCCH). Monitoring the number of control channels on each of the CCs may comprise monitoring the number of PDCCH candidates on each of the CCs.

The candidates for a PDCCH may also be referred to as PDCCH candidates.

Particularly, the method may be a method of monitoring PDCCH candidates on CCs in at least two FRs at a radio device. The method may comprise or initiate a step of transmitting radio parameters that are, for each of the at least two FRs, indicative of the radio device's capability of monitoring a number of PDCCH candidates on each of the CCs. The method may further comprise or initiate a step of monitoring, in each of the at least two FRs, the number of PDCCH candidates on each of the CCs according to the indicated capability.

The number of PDCCH candidates monitored on each of the CCs according to the indicated capability may comprise a tabulated number of PDCCH candidates for each of the CCs configured for the radio device depending on whether the number of configured CCs is equal to or less than a number of CCs indicated by the radio parameters for the respective FRs. The number of PDCCH candidates monitored on each of the CCs according to the indicated capability may comprise a partitioned number of PDCCH candidates for each of the CCs configured for the radio device if the number of configured CCs is greater than a number of CCs indicated by the radio parameters for the respective FRs. The partitioned number of PDCCH candidates may be a function of the tabulated number of PDCCH candidates for the respective CC, e.g., in correspondence to the above formula for the partitioned number, $N^{total,k,\mu}$ and the tabulated number $N^{max,\mu}$, wherein the control channels are the PDCCH candidates. The tabulated number may also be referred to as a non-CA limit for the monitored PDCCH candidates (non-CA PDCCH BD limit).

Monitoring the PDCCH candidates may comprise performing a blind decoding (BD) on the respective PDCCH candidates.

The blind decoding may also be referred to as blind detection. The blind decoding may comprise decoding symbols received on the respective PDCCH candidates, e.g., assuming that a cyclic redundancy check (CRC) is scrambled with an identifier of the radio device.

The control channels may comprise non-overlapped control channel elements (CCEs). Monitoring the number of control channels on each of the CCs may comprise monitoring a number of non-overlapped CCEs on each of the CCs.

Particularly, the method may be a method of monitoring non-overlapped CCEs on CCs in at least two FRs at a radio device. The method may comprise or initiate a step of transmitting radio parameters that are, for each of the at least two FRs, indicative of the radio device's capability of monitoring a number of non-overlapped CCEs on each of the CCs. The method may further comprise or initiate a step of monitoring, in each of the at least two FRs, the number of non-overlapped CCEs on each of the CCs according to the indicated capability.

The number of non-overlapped CCEs monitored on each of the CCs according to the indicated capability may comprise a tabulated number of non-overlapped CCEs for each of the CCs configured for the radio device depending on whether the number of configured CCs is equal to or less than a number of CCs indicated by the radio parameters for the respective FRs. The number of non-overlapped CCEs monitored on each of the CCs according to the indicated capability may comprise a partitioned number of non-overlapped CCEs for each of the CCs configured for the radio device if the number of configured CCs is greater than a number of CCs indicated by the radio parameters for the respective FRs. The partitioned number of non-overlapped CCEs may be a function of the tabulated number of non-overlapped CCEs for the respective CC, e.g., in correspondence to the above formula for the partitioned number $N^{total,k,\mu}$, and the tabulated number $N^{max,\mu}$, wherein the control channels are the non-overlapped CCEs. The tabulated number may also be referred to as a non-CA limit for the non-overlapped CCEs (non-CA CCE limit).

A number of the CCEs per PDCCH candidate (e.g., the number of aggregated CCEs used per PDCCH candidate) may correspond to an aggregation level.

The CCEs corresponding to the respective PDCCH candidates may be allocated in a search space according to at least one of the number of non-overlapped CCEs and a hashing function. Optionally, the hashing function may depend on an identifier of the radio device.

At least some of the control channels, particularly at least some of the PDCCH candidates or CCEs, may comprise downlink control information (DCI) for the radio device. The method may further comprise or initiate the step of buffering a number of DCIS received on at least some of the control channels, particularly on at least some of the PDCCH candidates or the CCEs, in the FRs depending on the radio parameter for the respective one of the FRs.

The CCs in a first FR of the FRs may be aggregated in a first carrier aggregation (CA) and the CCs in a second FR of the FRs may be aggregated in a second CA other than the first CA.

Each CA may comprise one CC corresponding to a primary cell (PCell) and one or more CCs corresponding to a secondary cell (SCell).

The number of control channels to be monitored on each of the CCs in the FRs may be determined according to the capability indicated by the radio parameters for the respective one of the first and second FRs.

The CCs in a first FR of the FRs and the CCs in a second FR of the FRs may be aggregated in a CA. The method may further comprise or initiate deriving a single parameter from a first radio parameter of the radio parameters, which corresponds to the first FR, and from another second radio parameter of the radio parameters, which corresponds to the second FR. The number of control channels on each of the CCs in both the first FR and the second FR may be determined based on a capability indicated by the single parameter.

The single parameter may be at least one of a minimum of the first and second radio parameters, a maximum of the first and second radio parameters, a sum of the first and second radio parameters, and an average of the first and second radio parameters.

The CCs in a first FR of the FRs and the CCs in a second FR of the FRs may be aggregated or may be to be aggregated in a CA. The method may further comprise or initiate the step of, responsive to the transmission of a first radio parameter corresponding to the first FR and a second radio parameter corresponding to the second FR, wherein the second radio parameter is different from the first radio parameter, receiving a control message indicative of a request for changing at least one of the first radio parameter and the second radio parameter to the same value.

A Master Cell Group (MCG) may comprise CCs on a first FR of the at least two FRs. A Secondary Cell Group (SCG) may comprise CCs on a second FR of the at least two FRs.

The CCs may be aggregated with cross-carrier scheduling. The number of control channels to be monitored may depend on the combination of a numerology of a scheduling CC and a numerology of a scheduled CC.

The first method aspect may be implemented in combination with any of the features and embodiments disclosed with reference to the drawings.

As to a second method aspect, a method of transmitting control channels on component carriers, CCs, in at least two frequency ranges, FRs, to a radio device is provided. The method comprises or initiates a step of receiving, from the radio device, radio parameters that are, for each of the at least two FRs, indicative of the radio device's capability of monitoring a number of control channels on each of the CCs. The method further comprises or initiates a step of transmitting control information to the radio device in each of the at least two FRs using the number of control channels on each of the CCs according to the indicated capability.

The second method aspect may further comprise any feature and any step disclosed in the context of the first method aspect, or a feature or step corresponding thereto, e.g., a receiver counterpart to a transmitter feature or step.

The technique, particularly the second method aspect, may be implemented in combination with any of the features and embodiments disclosed with reference to the drawings.

In any aspect, the technique may be implemented as a technique for partitioning a monitoring capability, e.g., in extension of the 3GPP document TS 38.331, version 15.4.0.

The first method aspect may be performed at or by the radio device (e.g., UE). The radio device may transmit data to and/or receive data from at least one base station based on control information received by monitoring the number of control channels.

The second method aspect may be performed at or by a base station (e.g., a gNB). The base station may transmit data to and/or receive data from the radio device based on control information transmitted using the number of control channels.

In any aspect, the radio device and/or the base station may form, or may be part of, a radio network, e.g., according to the Third Generation Partnership Project (3GPP) or according to the standard family IEEE 802.11 (Wi-Fi). The first and second method aspects may be performed by one or more embodiments of the radio device and the base station, respectively, in the radio network. The radio network may be a radio access network (RAN). The RAN may comprise one or more embodiment of base stations, e.g., configured to perform the second method aspect. Alternatively or in addition, the radio network may be a vehicular, ad hoc and/or mesh network comprising two or more embodiments of the radio devices, e.g., configured to perform sidelink communications under the control of one or more base station according to the second method aspect.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with any of the base stations.

The base station may encompass any station that is configured to provide radio access to any of the radio devices. The base stations may also be referred to as transmission and reception point (TRP), radio access node or access point (AP). The base station or one of the radio devices functioning as a gateway (e.g., between the radio network and the RAN and/or the Internet) may provide a data link to a host computer providing the first and/or second data. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical (PHY) layer, a Medium Access Control (MAC) layer, a Radio Link Control (RLC) layer and/or a Radio Resource Control (RRC) layer of a protocol stack for the radio communication. For example, the method aspects may be performed on the PHY layer or initiated on the MAC, RLC and/or RRC layers.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the methods may be encoded in a Field-Programmable Gate Array (FPGA) and/or an Application-Specific Integrated Circuit (ASIC), or the functionality may be provided for download by means of a hardware description language.

As to a first device aspect, a device for monitoring control channels on component carriers (CCs) in at least two frequency ranges (FRs) at a radio device is provided. The device may be configured to perform any one of the steps of the first method aspect.

As to a second device aspect, a device for transmitting control channels on component carriers (CCs) in at least two frequency ranges (FRs) at a radio device is provided. The device may be configured to perform any one of the steps of the second method aspect.

As to a further first device aspect, a device for monitoring control channels on component carriers (CCs) in at least two frequency ranges (FRs) at a radio device is provided. The device comprises at least one processor and a memory. Said memory comprises instructions executable by said at least one processor whereby the device is operative to perform any one of the steps of the first method aspect.

As to a further second device aspect, a device for transmitting control channels on component carriers (CCs) in at least two frequency ranges (FRs) at a radio device is provided. The device comprises at least one processor and a memory. Said memory comprises instructions executable by said at least one processor whereby the device is operative to perform any one of the steps of the second method aspect.

As to a still further aspect a communication system including a host computer is provided. The host computer comprises a processing circuitry configured to provide user data, e.g., included in the first and/or second data of the multi-layer transmission. The host computer further comprises a communication interface configured to forward data to a cellular network (e.g., the RAN and/or the base station) for transmission to a UE.

A processing circuitry of the cellular network may be configured to execute any one of the steps of the second method aspect. Alternatively or in addition, the UE comprises a radio interface and processing circuitry, which is configured to execute any one of the steps of the first method aspect.

The communication system may further include the UE. Alternatively, or in addition, the cellular network may further include one or more base stations configured for radio communication with the UE and/or to provide a data link between the UE and the host computer using the first and/or second method aspects.

The processing circuitry of the host computer may be configured to execute a host application, thereby providing user data and/or any host computer functionality described herein. Alternatively, or in addition, the processing circuitry of the UE may be configured to execute a client application associated with the host application.

Any one of the devices, the UE, the base station, the communication system or any node or station for embodying the technique may further include any feature disclosed in the context of the method aspects, and vice versa. Particularly, any one of the units and modules disclosed herein may be configured to perform or initiate one or more of the steps of the method aspects.

BRIEF DESCRIPTION OF THE DRAWINGS

Further details of embodiments of the technique are described with reference to the enclosed drawings, wherein:

FIG. 7A schematically illustrates a second example for a carrier aggregation of component carriers in different frequency ranges using cross-carrier scheduling;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including a Wireless Local Area Network (WLAN) implementation according to the standard family IEEE 802.11, 3GPP LTE (e.g., LTE-Advanced or a related radio access technique such as Multe-Fire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
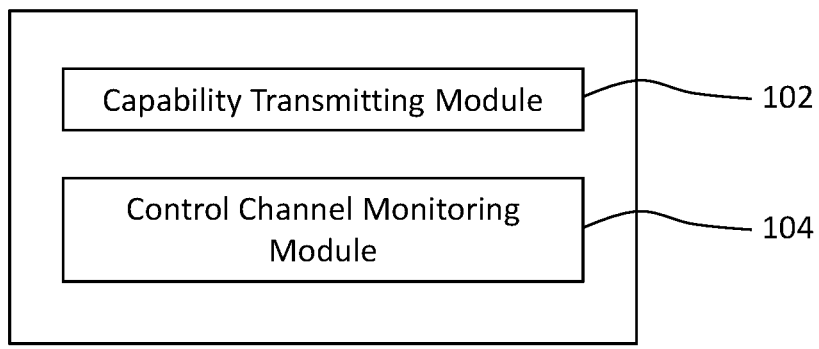
FIG. 1 shows a schematic block diagram of an embodiment of a device for monitoring control channels on component carriers in at least two frequency ranges.

FIG. 1 schematically illustrates a block diagram of an embodiment of a device for monitoring control channels on component carriers (CCs) in at least two frequency ranges, FRs, at a radio device. The device is generically referred to by reference sign 100.

The device 100 comprises a capability transmitting module 102 that transmits radio parameters that are, for each of the at least two FRs, indicative of the radio device's capability of monitoring a number of control channels on each of the CCs. The device 100 further comprises a control channel monitoring module 104 that monitors, in each of the at least two FRs, the number of control channels on each of the CCs according to the indicated capability.

Any of the modules of the device 100 may be implemented by units configured to provide the corresponding functionality.

The device 100 may also be referred to as, or may be embodied by, the radio device (or briefly: UE). The radio device 100 and a base station may be in direct radio communication. The base station may be embodied by below device 200.

Figure 2:
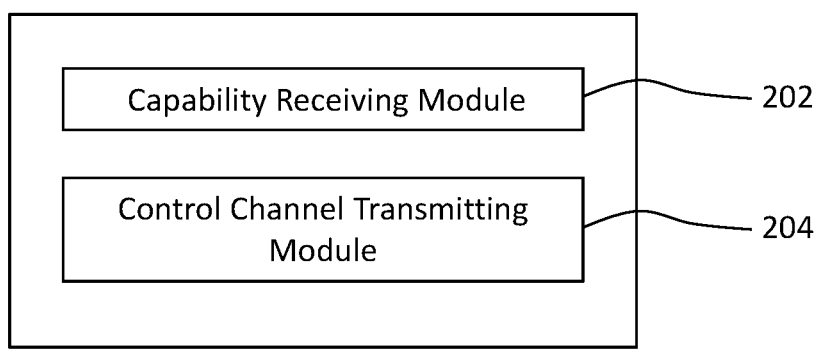
FIG. 2 shows a schematic block diagram of an embodiment of a device for transmitting control channels on component carriers in at least two frequency ranges.

FIG. 2 schematically illustrates a block diagram of an embodiment of a device for transmitting control channels on CCs in at least two FRs to a radio device. The device is generically referred to by reference sign 200.

The device 200 comprises a capability receiving module 202 that receives, from the radio device, radio parameters that are, for each of the at least two FRs, indicative of the radio device's capability of monitoring a number of control channels on each of the CCs. The device 200 further comprises a control channel transmitting module 204 that transmits control information to the radio device in each of the at least two FRs using the number of control channels on each of the CCs according to the indicated capability.

Any of the modules of the device 200 may be implemented by units configured to provide the corresponding functionality.

The device 200 may also be referred to as, or may be embodied by, a base station (or briefly: gNB). The radio device and the based station 200 may be in direct radio communication. The radio device may be embodied by the device 100.

Figure 3:
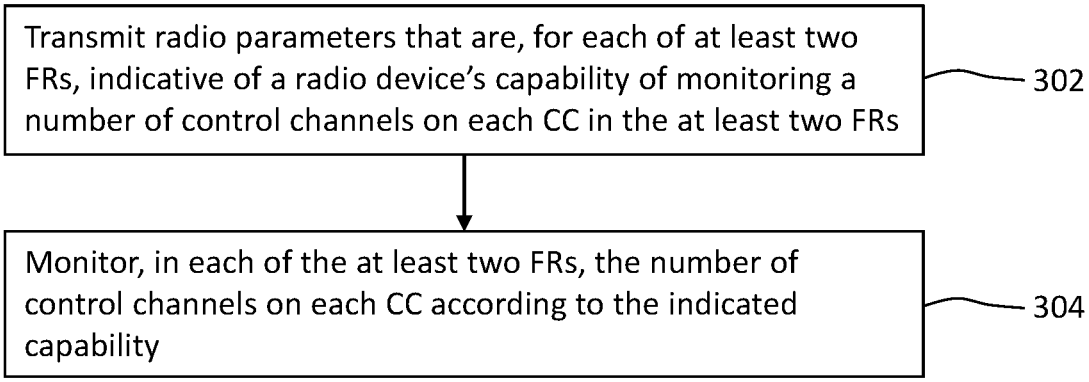
FIG. 3 shows a flowchart for an implementation of a method of monitoring control channels on component carriers in at least two frequency ranges, which method may be implementable by the device of FIG. 1.

FIG. 3 shows an example flowchart for a method 300 of monitoring control channels on CCs in at least two FRs at a radio device.

Radio parameters that are, for each of the at least two FRs, indicative of the radio device's capability of monitoring a number of control channels on each of the CCs are transmitted in a step 302. In each of the at least two FRs, the number of control channels is monitored on each of the CCs according to the indicated capability in a step 304.

The method 300 may be performed by the device 100. For example, the modules 102 and 104 may perform the steps 302 and 304, respectively.

Figure 4:
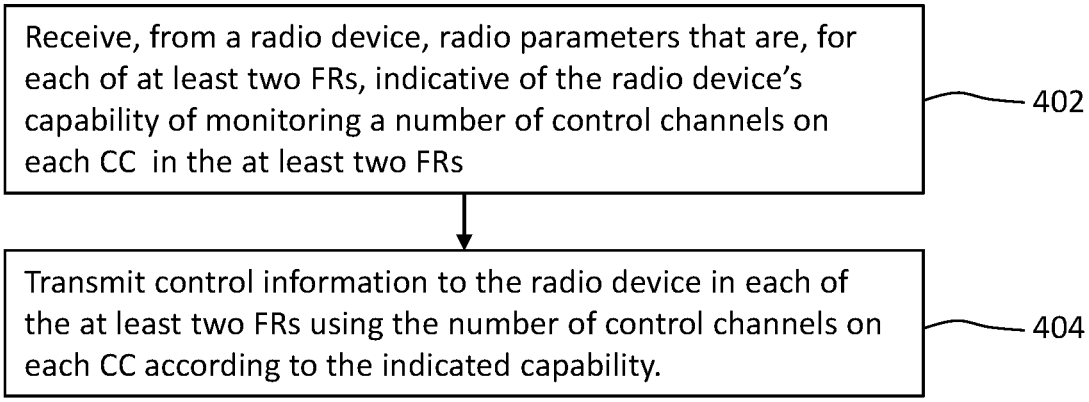
FIG. 4 shows a flowchart for an implementation of a method of transmitting control channels on component carriers in at least two frequency ranges, which method may be implementable by the device of FIG. 2.

FIG. 4 shows an example flowchart for a method 400 of transmitting control channels on CCs in at least two FRs to a radio device.

In a step 402, radio parameters that are, for each of the at least two FRs, indicative of the radio device's capability of monitoring a number of control channels on each of the CCs are received from the radio device. Control information is transmitted to the radio device in each of the at least two FRs using the number of control channels on each of the CCs according to the indicated capability in a step 404.

The method 400 may be performed by the device 200. For example, the modules 202 and 204 may perform the steps 402 and 404, respectively.

In any aspect, while the technique is described primarily as a means for providing downlink control information, the technique may be used for controlling any data communication based on the downlink control information, e.g., for an uplink (UL) transmission, a downlink (DL) transmission or direct communications between radio devices, e.g., device-to-device (D2D) communications or sidelink (SL) communications.

The device 100 and device 200 may be embodied by a radio device and a base station, respectively. Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrow-band) Internet of Things (IoT). Two or more radio devices may be configured to wirelessly connect to each other, e.g., in an ad hoc radio network or via a 3GPP SL connection. Furthermore, any base station may be a station providing radio access, may be part of a radio access network (RAN) and/or may be a node connected to the RAN for controlling the radio access. For example, the base station may be an access point, for example a Wi-Fi access point.

Figure 5:
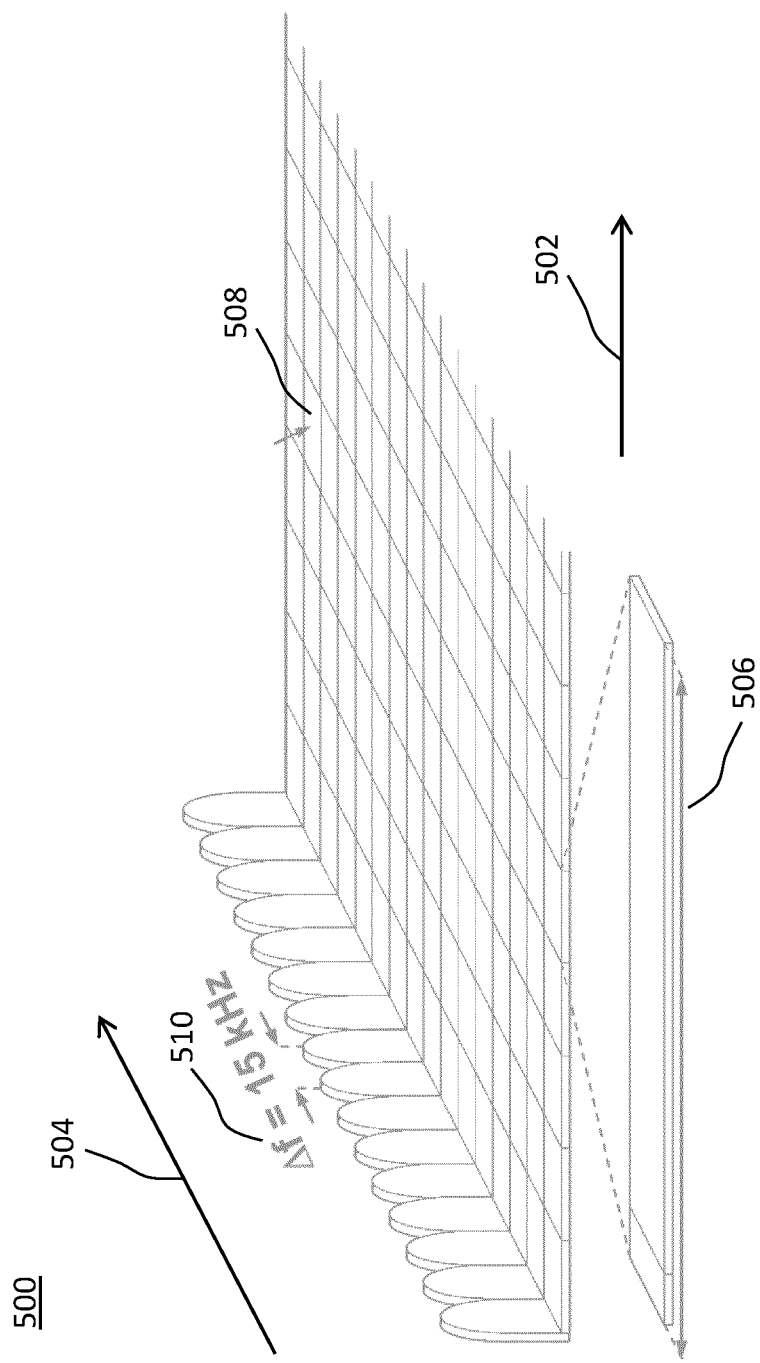
FIG. 5 schematically illustrates an exemplary structure of radio resources for embodying the devices of FIGS. 1 and 2 or implementing the methods of FIGS. 3 and 4.

FIG. 5 schematically illustrates an exemplary structure of radio resources for embodying the devices 100 and 200 and/or implementing the methods 300 and 400, e.g., according to 3GPP NR. Time 502 is illustrated on a horizontal axis. Frequency 504 is illustrated on a diagonal axis.

The smallest unit of the time 502 in the time-frequency grid 500 comprises one orthogonal frequency-division multiplexing (OFDM) symbol 506. The combination of one subcarrier and one OFDM symbol defines a resource element (RE) 508. The smallest unit of the frequency 504 comprises one subcarrier. The frequency offset from one subcarrier to the next subcarrier is the subcarrier spacing (SCS) 510.

A UE embodying the device 100 may monitor a physical layer downlink control channel (PDCCH) as an example of the control channels, e.g., according to 3GPP NR. In 3GPP NR, downlink control information (DCI) is received over the PDCCH.

The PDCCH may carry DCI in messages with different formats. DCI format 0_0 and DCI format 0_1 are DCI messages used to convey uplink grants to the UE 100 for transmission of the PHY layer data channel in the UL (i.e., the physical uplink shared channel, PUSCH). DCI format 1_0 and DCI format 1_1 are used to convey downlink grants for transmission of the PHY layer data channel in the DL (i.e., the physical downlink shared channel, PDSCH). Other DCI formats (e.g., 2_0, 2_1, 2_2 and 2_3) are used for other purposes such as transmission of slot format information, reserved resource, transmit power control information etc.

As an example of implementing the step 304, a PDCCH candidate (as an example of the control channels) is searched within a common or UE-specific search space, which is mapped to a set of time and frequency resources referred to as a control resource set (CORESET). The search spaces within which PDCCH candidates must be monitored are configured to the UE via radio resource control (RRC) signaling. The RRC signaling may comprise or may be indicative of the number of physical resource blocks (PRBs, e.g., 12 subcarriers) for the CORESET in the frequency domain 504 and/or the number of symbols 506 for the CORESET in the time domain 502 (i.e., the duration).

A monitoring periodicity may be configured for different or multiple PDCCH candidates. In any particular slot, the UE 100 may be configured to monitor multiple PDCCH candidates in multiple search spaces, which may be mapped to one or more CORESETs. PDCCH candidates may need to be monitored multiple times in a slot, once every slot or once in multiple of slots.

The smallest unit used for defining CORESETs is a Resource Element Group (REG) which is defined as spanning 1 PRB×1 OFDM symbol 506 in frequency 504 and time 502. Each REG contains demodulation reference signals (DM-RS) to aid in the estimation of the radio channel over which that REG was transmitted. When transmitting the PDCCH, a precoder may be used to apply weights at the transmit antennas based on some knowledge of the radio channel prior to transmission. It is possible to improve channel estimation performance at the UE 100 by estimating the channel over multiple REGs that are proximate in time 502 and frequency 504 if the precoder used at the transmitter for the REGs is not different.

To assist the UE 100 with channel estimation, the multiple REGs may be grouped together to form a REG bundle. A REG bundle size for a CORESET may be indicated to the UE 100. The UE 100 may assume that any precoder used for the transmission 404 of the PDCCH is the same for all the REGs in the REG bundle. A REG bundle may consist of 2, 3 or 6 REGs.

Alternatively or in addition, control channel elements (CCEs) are a further example for the control channels.

Each CCE may comprise, e.g., 6 REGs. The REGs within a CCE may either be contiguous or distributed in frequency. When the REGs are distributed in frequency, the CORESET is said to be using an interleaved mapping of REGs to a CCE and if the REGs are not distributed in frequency, a non-interleaved mapping is said to be used.

A PDCCH candidate may span 1, 2, 4, 8 or 16 CCEs. The number of aggregated CCEs used is referred to as the aggregation level for the PDCCH candidate.

A hashing function may be used to determine the CCEs corresponding to PDCCH candidates that a UE must monitor within a search space set. The hashing can be done differently for different UEs so that the CCEs used by the UEs are randomized and the probability of collisions between multiple UEs for which PDCCH messages are included in a CORESET is reduced.

Blind decoding (BD) of potential PDCCH transmissions 404 is attempted by the UE in each of the configured PDCCH candidates within a slot. The complexity incurred at the UE to do this depends on the number of blind decoding attempts and the number of CCEs which need to be processed.

The number of control channels to be monitored in the step 304 may correspond to a limit. For example, in order to manage complexity, limits on the total number of CCEs and/or the total number of blind decodes to be processed by the UE 100 may be specified. Furthermore, the technique may be used for partitioning the monitoring (e.g., the BD and/or the monitoring of CCEs) based on UE-capability for NR operation with multiple component carriers (CCs).

The CCs of a carrier aggregation (CA) may also be referred to as downlink cells or serving cells, e.g., irrespective of whether all of the CCs or at least some of the CCs are transmitted from the same cell or base station or from different cells or base stations.

A CC carrying synchronization signals (e.g., in a physics broadcast channel, PBCH, of the respective CC) and/or radio resource control (RRC) signaling may be referred to as a primary cell (PCell). The one or more other CCs of the CA may be referred to as secondary cells (SCells).

When a UE is configured with one serving cell, a per-serving cell limit on PDCCH blind decoding and CCE limit are shown in the following tables. For convenience this is also referred to as non-CA limit (e.g., although these limits may be applied for a CA aggregating up to 4 CCs and/or if the number of CCs does not exceed the capability indicated by the UE) or as tabulated number.

Below tables provide examples for the non-CA limits (which are also referred to as tabulated numbers) depending on a numerology µ for monitoring PDCCH candidates and for monitoring (non-overlapped) CCEs, respectively.

| µ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |

| µ | Maximum number of non-overlapped CCEs per slot and per serving cell $C_{PDCCH}^{max,slot,\mu}$ |
|---|---|
| 0 | 56 |
| 1 | 56 |
| 2 | 48 |
| 3 | 32 |

The value µ indicates the numerology of the corresponding subcarrier spacing (SCS), i.e., the SCS is 15·2^µ kHz. For example, µ=0 may correspond to the subcarrier spacing used for LTE.

For the case of a UE supporting carrier aggregation (CA), the UE may be allowed to support a reduced complexity in terms of handling PDCCH and/or CCE by signaling a capability of the UE.

This is described in the 3GPP document TS 38.213, version 15.4.0, section 10.1, as follows.
Beginning of Quotation
If a UE
  is capable for operation with carrier aggregation with a maximum of 4 downlink cells or indicates through pdcch-BlindDetectionCA a capability to monitor PDCCH candidates for $N_{cells}^{cap} \geq 4$ downlink cells, and
  is configured with $N_{cells}^{DL,\mu}$ downlink cells with DL BWPs having SCS configuration µ where $$\sum_{\mu=0}^{3} N_{cells}^{DL,\mu} \leq 4 \text{ or } \sum_{\mu=0}^{3} N_{cells}^{DL,\mu} \leq N_{cells}^{cap},$$

respectively,
  the UE is not required to monitor, on the active DL BWP of the scheduling cell, more than $M_{PDCCH}^{total,slot,\mu}=M_{PDCCH}^{max,slot,\mu}$ PDCCH candidates or more than $C_{PDCCH}^{total,slot,\mu}=C_{PSCCH}^{max,slot,\mu}$ non-overlapped CCEs per slot for each scheduled cell.
If a UE
  indicates through pdcch-BlindDetectionCA a capability to monitor PDCCH candidates for $N_{cells}^{cap} \geq 4$ downlink cells, and
  is configured with $N_{cells}^{DL,\mu}$ downlink cells with DL BWPs having SCS configuration µ, where $$\sum_{\mu=0}^{3} N_{cells}^{DL,\mu} > N_{cells}^{cap},$$

a DL BWP of an activated cell is the active DL BWP of the activated cell, and a DL BWP of a deactivated cell is the DL BWP with index provided by firstActiveDownlinkBWP-Id for the deactivated cell the UE is not required to monitor more than $$M_{PDCCH}^{total,slot,\mu} = \left\lfloor N_{cells}^{cap} \cdot M_{PDCCH}^{max,slot,\mu} \cdot N_{cells}^{DL,\mu} \Big/ \sum_{j=0}^{3} N_{cells}^{DL,j} \right\rfloor$$

PDCCH candidates or more than $$C_{PDCCH}^{total,slot,\mu} = \left\lfloor N_{cells}^{cap} \cdot C_{PDCCH}^{max,slot,\mu} \cdot N_{cells}^{DL,\mu} \Big/ \sum_{j=0}^{3} N_{cells}^{DL,j} \right\rfloor$$

non-overlapped CCEs per slot on the active DL BWP(s) of scheduling cell(s) from the $N_{cells}^{DL,\mu}$ downlink cells.
End of Quotation The physical layer parameter pdcch-BlindDetectionCA is also used as an input to the maximum number of DCIS that a UE may need to buffer. This is described in the 3GPP document TS 38.213, version 15.4.0, section 10.1, as follows.
Beginning of Quotation
  If a UE indicates through pdcch-BlindDetectionCA a capability to monitor PDCCH candidates for $N_{cells}^{cap} \geq 4$ downlink cells and the UE is configured with $N_{cells}^{DL} > 4$ downlink cells or $N_{cells}^{UL} > 4$ uplink cells, the UE expects to have respectively received at most $16 \cdot N_{cells}^{cap}$ PDCCHs for
  DCI formats 1_0 or 1_1 with CRC scrambled by a C-RNTI, or a CS-RNTI, or a MCS-RNTI scheduling $16 \cdot N_{cells}^{cap}$ PDSCH receptions for which the UE has not received any corresponding PDSCH symbol over all $N_{cells}^{DL}$ downlink cells
  DCI formats 0_0 or 0_1 with CRC scrambled by a C-RNTI, or a CS-RNTI, or a MCS-RNTI scheduling $16 \cdot N_{cells}^{cap}$ PUSCH transmissions for which the UE has not transmitted any corresponding PUSCH symbol over all $N_{cells}^{UL}$ uplink cells
End of Quotation
A capability signaling, i.e., the radio parameter pdcch-BlindDetectionCA (e.g., described in the 3GPP document TS 38.306), is as follows.

| Definitions for parameters | Per M | FDD-TDD DIFF | FR1-FR2 DIFF |
|---|---|---|---|
| pdcch-BlindDetectionCA Indicates PDCCH blind decoding capabilities supported by the UE for CA with more than 4 CCs as specified in the 3GPP document TS 38.213. The field value is from 4 to 16. | UE Tbd | No | Yes |

The capability for CA blind detection, pdcch-BlindDetectionCA, indicates a differentiation based on the frequency range (FR), e.g., the frequency ranges FR1 and FR2. That is, the UE 100 may report two values—one for the frequency range FR1 and one for the frequency range FR2. The technique may be implemented to ensure, if the UE 100 reports two different values as the radio parameters transmitted in the step 302 for the two FRs, respectively, that these two values are consistently or uniquely applied in different cases of CA, e.g., including a CA between FR1 and FR2.

An exemplary embodiment of the technique, e.g., to reduce the complexity of the PDCCH BD for CA is described. The UE 100 may report a value Y to the gNB 200 as the radio parameters in the step 302. Y can be pdcch-BlindDetectionCA. The number of configured serving cells (e.g., CCs) for the UE 100 may be X.

If X≤Y, for each serving cell (e.g., CCs), the maximum allowed PDCCH BD in the step 404 or 304 is given by the non-CA PDCCH BD limit (i.e., the tabulated number for PDCCH candidates) and the maximum allowed PDCCH BD (e.g., BD attempts) in the step 304 is given by the non-CA PDCCH BD limit (i.e., the tabulated number for PDCCH candidates).

If X>Y, for each serving cell, the maximum allowed PDCCH BD for the steps 304 and 404 is given by the minimum of a) the non-CA PDCCH BD limit and b) a value derived from at least one of X, Y, numerology of the serving cells and the non-CA PDCCH BD limit (i.e., the tabulated number for PDCCH candidates).

Alternatively or in addition, the same principle as above may also be applied for a CCE limit, e.g., to reduce channel estimation complexity. For example, the maximum allowed CCEs is given by the minimum of a) the non-CA CCE limit (i.e., the tabulated number for CCEs) and b) a value derived from X, Y, numerology of the serving cells and non-CA CCE limit (i.e., the tabulated number for CCEs).

Given the FR1 and FR2 capabilities and/or because processing timelines may be different, it may not be possible to always have fully flexible PDCCH BD budgeting split or reallocation of BDs and/or CCEs between FR1 and FR2. Therefore, it is beneficial to allow the UE 100 to report in the step 302 a capability with differentiation between the at least two FRs, e.g., FR1 and FR2, and ensure that the monitoring of the control channels, e.g., the PDCCH BD and/or CCE handling, works effectively for all cases of CA and/or dual connectivity schemes envisioned for NR.

Herein, the component carriers (CCs) of the CA may also be referred to as carriers. CCs on the FR1 may also be referred to as FR1-carriers. CCs on the FR2 may also be referred to as FR2-carriers.

Given the above, following cases can be considered for the monitoring of the control channels (e.g., a BD and/or CCE split):

Case 1-1: CA between FR1-carriers only
  Apply the reported capability for FR1 for all aggregated carriers
Case 1-2: CA between FR2-carriers only
  Apply the reported capability for FR2 for all aggregated carriers
Case 1-3: CA between FR1-carriers and FR2-carriers
  Option 1:
    Apply the reported capability for FR1 to aggregated FR1 carriers only, and
    apply the reported capability for FR2 to aggregated FR2 carriers only
  Option 2:
    Apply one single value derived from reported capabilities for FR1 and FR2, and apply this single value for all aggregated FR1 and FR2 carriers together
      Single value=max (reported capability for FR1, reported capability for FR2)
      Single value=min (reported capability for FR1, reported capability for FR2)
      Single value=sum (reported capability for FR1, reported capability for FR2)
      Require UE to set the reported capability value for FR1 to be equal to the reported capability value for FR2.
      This effectively means no differentiation between FR1 and FR2
  Option 3:
    Apply one single reported capability for FR1 and FR2 together
    This means no differentiation between FR1 and FR2.
Case 2: Master Cell Group (MCG) on FR1 and Secondary Cell Group (SCG) on FR2
  Apply the reported capability for FR1 for the aggregated FR1 carriers
  Apply the reported capability for FR2 for the aggregated FR2 carriers
  Note : Effectively monitoring per-FR is similar to per-CG, and requires no additional inter-gNB signalling for PDCCH BD/CCE split
Case 3: MCG on FR2 and SCG on FR1
  Similar to Case 2
  Note : Effectively monitoring per-FR is similar to per-CG, and requires no additional inter-gNB signalling for PDCCH BD/CCE split A first class of embodiments of a UE 100 and a gNB 200 performs the methods 300 and 400, respectively, for CA between FR1-carriers and FR2-carriers.

A second class of embodiments of a UE 100 and a gNB 200 performs the methods 300 and 400, respectively, for CA between FR1-carriers and FR2-carriers, including cross-carrier scheduling of a carrier in one FR from a carrier in another FR.

The first class of embodiments may perform the monitoring 304 and the transmitting 404 of control channels by BD and/or monitoring CCEs. The embodiments enable handling of BD and/or CCEs for CA between FR1-carriers and FR2-carriers.

According to the first class of embodiments, the UE 100 reports in the step 302 a first pdcch-BlindDectionCA value (Y1) for a first frequency range and a second pdcch-BlindDectionCA value (Y2) for a second frequency range. The UE 100 can be configured with a single cell group, and within the cell group with a first number of carriers (N1) belonging to the first frequency range and a second number of carriers (N2) belonging to the second frequency range. The first frequency range can be FR1, and the second frequency range can be FR2. The first frequency range can for example correspond to operation on serving cells or component carriers (CCs) whose carrier center frequency is lower range (e.g. 6 GHz). The second frequency range can for example correspond to operation on serving cells or component carriers (CCs) whose carrier center frequency is higher (e.g. 24 GHz).

The UE 100 can be configured with a set of component carriers (CCs) for carrier aggregation, e.g. CA, operation. A first subset of CCs of the set of CCs belongs to a first frequency range (FR1) and a second subset of CCs of the set of CCs belongs to a second frequency range (FR2). The UE 100 can report a capability indication (i.e., the radio parameter) including at least a first value (Y1) associated with FR1 and a second value (Y2) associated with FR2. The UE 100 can determine in the step 304 the number of PDCCH BDs and/or CCEs that the UE 100 is expected to perform on CCs of the first subset of CCs based on at least one of (a) the first value Y1;
(b) a number of maximum possible BDs and/or CCEs on each CC of the first subset of CCs (e.g., the tabulated number and/or a number pre-specified in 3GPP specifications); and
(c) the number of CCs in the first subset of CCs.

Similarly, the UE 100 can determine the number of PDCCH BDs and/or CCEs that the UE 100 is expected to perform on CCs of the second subset of CCs based on at least one of
(a) the second value Y2;
(b) a number of maximum possible BDs and/or CCEs on each CC of the second subset of CCs (e.g., the tabulated number and/or a number pre-specified in 3GPP specifications); and
(c) the number of CCs in the second subset of CCs.

The UE 100 may determine the number of maximum possible BDs and/or CCEs on a given CC based on the subcarrier-spacing (SCS) 510 used for receiving PDCCH on that CC. If the SCS of CCs in the first subset of CCs is different (e.g. 15 kHz SCS for CC11 and 30 kHz SCS for CC12 where CC11 and CC12 belong to the first subset), then the UE can determine different number of BDs and/or CCEs, e.g. K11 for CC11 and K12 for CC12, based on the SCS. If the SCS is same for all the CCs in the first subset, the UE 100 can determine one common value K1 which would be the total number of BDs and/or CCEs that the UE 100 is expected to perform across all CCs in the first subset of CCs.

Similar operation applies also to CCs in the second subset (i.e., those belonging to FR2).

The UE 100 determines the number of PDCCH BDs and/or CCEs to perform for a given search space (SS) or search space set (SS set) on a CC of the first subset of CCs, based on a higher layer configured parameter indicating the number BDs and/or CCEs for that SS and/or SS set, and based on the number of PDCCH BDs/CCEs that it, e.g. the UE 100, is expected to perform on CCs of the first subset of CCs (i.e., K1 or K11, K12 described above). Similar operation applies also to CCs in the second subset (i.e., those belonging to FR2).

From a perspective of the gNB 200, when transmitting a PDCCH to the UE 100 in the first subset of CCs, the gNB 200 can determine the number of PDCCH BDs and/or CCEs that the UE 100 is expected to perform processing on the first subset (e.g., K11, K12, K1 explained above) in order to transmit PDCCH to the UE 100 in the step 404. Therefore, the gNB 200 may also perform the above steps to compute K1, K11, K12 in the step 402 or 404 (e.g., as described above for the method 300). A similar operation applies also to CCs in the second subset (i.e., those belonging to FR2).

In a first group of embodiments, the technique can be implemented to avoid ambiguities due to differently reported radio parameters for different FRs, e.g., by applying the respectively reported capability for a frequency range FRx to aggregated carriers in said FRx only. (For example, x=1 or 2.)

In an embodiment of the UE 100, the number of monitored control channels, e.g., the number of PDCCH BDs and/or CCEs for carriers belonging to the first frequency range is determined based on the first pdcch-BlindDectionCA value (Y1) and the first number of carriers (N1). In a further example, the number of PDCCH BDs and/or CCEs for carriers belonging to the first frequency range is not based on the second pdcch-BlindDectionCA value (Y2) or the second number of carriers (N2).

In another embodiment, or in combination with the aforementioned embodiment, the UE 100 determines the number of monitored control channels, e.g., the PDCCH BDs and/or CCEs, for carriers belonging to the second frequency range based on the second pdcch-BlindDectionCA value (Y2) and the second number of carriers (N2). In a further example, the number of PDCCH BDs and/or CCEs for carriers belonging to the second frequency range is not based on the first pdcch-BlindDectionCA value (Y1) or the first number of carriers (N1).

In a second group of embodiments, the technique can be implemented to avoid ambiguities due to differently reported radio parameters for different FRs, e.g., by applying one single value derived from the reported capabilities for all aggregated carriers.

In an embodiment, a single reference pdcch-BlindDection value (Y3) is derived from the first pdcch-BlindDectionCA value (Y1) and the second pdcch-BlindDectionCA value (Y2). Y3 can be the maximum of Y1 and Y2. Alternatively or in addition, Y3 can be the minimum of Y1 and Y2. Alternatively or in addition, Y3 can be Y1+Y2. Alternatively or in addition, the UE 100 may be required to report the capability value for FR1 to be equal to the reported value for FR2, i.e. NW, e.g. a network node, may expect a UE to report capability such that Y1=Y2.

In another embodiment, or in combination with the aforementioned embodiment, the UE 100 determines the number of PDCCH BDs and/or CCEs for carriers belonging to a frequency range based on the reference pdcch-BlindDectionCA value (Y3) and the total number of carriers (N1+N2).

In a third group of embodiments, the technique can be implemented to avoid ambiguities due to differently reported radio parameters for different FRs, e.g., by allow one single value for reporting capabilities for all aggregated carriers.

In an embodiment, the UE 100 can only report one value, which is applied together for FR1 and FR2. For example, if the UE 100 reports only the first pdcch-BlindDetectionCA value (Y1) and does not report the second pdcch-BlindDetectionCA value (Y2), the gNB 200 or the NW performing the method 400 may assume that Y1 applies to both FRs.

A further embodiment, which is similar to the first group of embodiments (i.e., applied per FR), but formulated slightly differently is described below.

The further embodiment addresses the case, e.g., where there is no cross-carrier scheduling between FR1 and FR2, or self-scheduling with different numerologies or cross-carrier scheduling with same numerology of scheduled cell and scheduling cell.

For CA with BD capability Y1 for a frequency range FR1 and/or BD capability Y2 for a frequency range FR2:
for scheduling CCs with a numerology labeled by i in the FRx (x=1 and/or 2) that are scheduling CCs (i.e. scheduled CCs) with numerology i that are in FRx,
if the number of configured CCs in FRx is less than or equal to 4 or is less than or equal to Yx,
the number of control channels to be monitored, e.g., the limit of BDs and/or CCEs of a scheduling CC per slot for a schedulable CC is ($M_i$ or $N_i$),
if the number of configured CCs in FRx is greater than Yx,
the number of control channels to be monitored, e.g., the limit of BDs/CCEs of the scheduling CCs per slot for schedulable CCs is $$\left\lfloor (M_i \text{ or } N_i) * \frac{X_i}{A} * Yx \right\rfloor$$

where

M$_i$ or N$_i$ denotes the tabulated number or limits of BDs and CCEs, respectively, for the non-CA case for numerology i, X$_i$ is the number of CCs with numerology i in FRx A is the total number of configured CCs that are in FRx The bracket is the floor function.

The technique may be implemented as reflected by the below Text Proposal (e.g., according to the first class of embodiments). The Text Proposal may update the 3GPP document TS 38.213, version 15.4.0, to address CA between FR1 and FR2. Furthermore, the below Text Proposal may implement the first group of embodiments.

More specifically, two Text Proposals are shown below, which correspond to changes on top of the current version 15.4.0 of the 3GPP document TS 38.213 at portions where the above clarification to the capability is applied. The proposed changes are shown in the bold and underlined font.

The portion may comprise section 10.1 of the 3GPP document TS 38.213. The text proposal may be implemented to address the partitioning of BD and/or CCE based on reported capability (i.e., the radio parameter).

Begin

If a UE is capable for operation with carrier aggregation with a maximum of 4 downlink cells for a frequency range or indicates through pdcch-BlindDetectionCA a capability to monitor PDCCH candidates for $N_{cells}^{cap} \geq 4$ downlink cells for a frequency range, and is configured with $N_{cells}^{DL,\mu}$ downlink cells for the frequency range with DL BWPs having SCS configuration μ where $$\sum_{\mu=0}^{3} N_{cells}^{DL,\mu} \leq 4 \text{ or } \sum_{\mu=0}^{3} N_{cells}^{DL,\mu} \leq N_{cells}^{cap},$$

respectively, the UE is not required to monitor, on the active DL BWP of the scheduling cell for the frequency range, more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell.

If a UE indicates through pdcch-BlindDetectionCA a capability to monitor PDCCH candidates for $N_{cells}^{cap} \geq 4$ downlink cells for a frequency range, and is configured with $N_{cells}^{DL,\mu}$ downlink cells for the frequency range with DL BWPs having SCS configuration μ, where $$\sum_{\mu=0}^{3} N_{cells}^{DL,\mu} > N_{cells}^{cap},$$

a DL BWP of an activated cell is the active DL BWP of the activated cell, and a DL BWP of a deactivated cell is the DL BWP with index provided by firstActiveDownlinkBWP-Id for the deactivated cell the UE is not required to monitor for the frequency range more than $$M_{PDCCH}^{total,slot,\mu} = \left\lfloor N_{cells}^{cap} \cdot M_{PDCCH}^{max,slot,\mu} \cdot N_{cells}^{DL,\mu} \bigg/ \sum_{j=0}^{3} N_{cells}^{DL,j} \right\rfloor$$

PDCCH candidates or more than $$C_{PDCCH}^{total,slot,\mu} = \left\lfloor N_{cells}^{cap} \cdot C_{PDCCH}^{max,slot,\mu} \cdot N_{cells}^{DL,\mu} \bigg/ \sum_{j=0}^{3} N_{cells}^{DL,j} \right\rfloor$$

non-overlapped CCEs per slot on the active DL BWP(s) of scheduling cell(s) from the $N_{cells}^{DL,\mu}$ downlink cells.

End

Alternatively or in addition, the below portion may update section 10.1 of the 3GPP document TS 38.213. The Text Proposal may be implemented to address a maximum number of buffered DCI based on the reported capability (i.e., the radio parameter).

Begin

Figure 6:
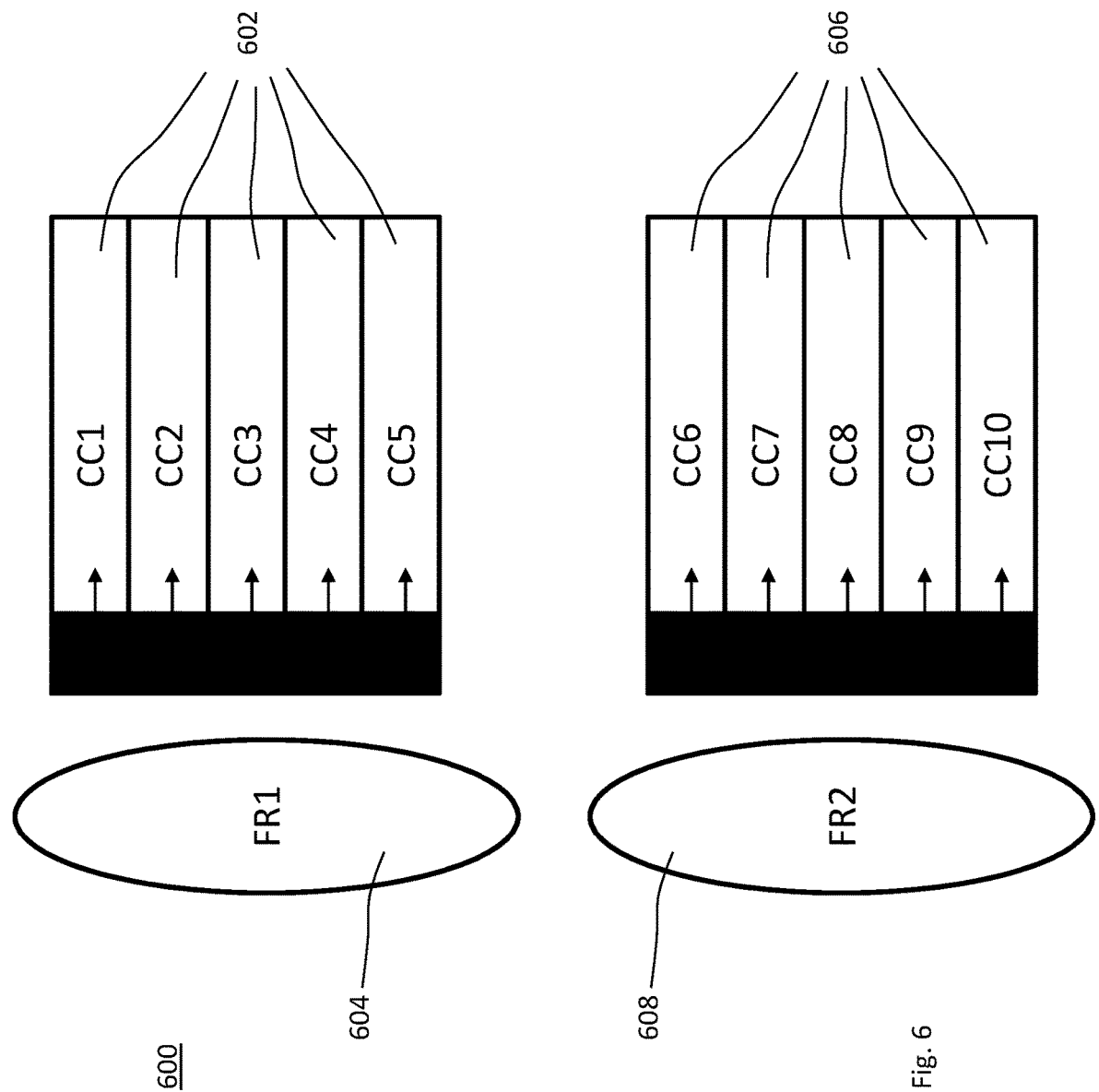
FIG. 6 schematically illustrates a first example for a carrier aggregation of component carriers in different frequency ranges using self-scheduling.

If a UE indicates through pdcch-BlindDetectionCA a capability to monitor PDCCH candidates for $N_{cells}^{cap} \geq 4$ downlink cells for a frequency range and the UE is configured with $N_{cells}^{DL} > 4$ downlink cells for the frequency range or $N_{cells}^{UL} > 4$ uplink cells for the frequency range, the UE expects to have respectively received at most $16 \cdot N_{cells}^{cap}$ PDCCHs for DCI formats 1_0 or 1_1 with CRC scrambled by a C-RNTI, or a CS-RNTI, or a MCS-RNTI scheduling $16 \cdot N_{cells}^{cap}$ PDSCH receptions for which the UE has not received any corresponding PDSCH symbol over all $N_{cells}^{DL}$ downlink cells in the frequency range DCI formats 0_0 or 0_1 with CRC scrambled by a C-RNTI, or a CS-RNTI, or a MCS-RNTI scheduling $16 \cdot N_{cells}^{cap}$ PUSCH transmissions for which the UE has not transmitted any corresponding PUSCH symbol over all $N_{cells}^{UL}$ uplink cells in the frequency range End An example for a CA 600 (e.g., based on above Text Proposal) is shown in FIG. 6, in which the UE 100 is configured with five CCs 602 in FR1 604. More specifically, three of the CCs 602 have SCS equal to 15 kHz and two have SCS equal to 30 kHz. Furthermore, the UE is configured with five CCs 606 in FR2 608, have SCS equal to 120 kHz. For simplicity, the same carrier scheduling or self-scheduling is assumed, and only BDs are shown as an example for monitoring the control channels.

Alternatively or in addition, the same principle can be applied for partitioning CCEs as another example for monitoring the control channels in the step 304.

The aggregate number of BDs for the 15 kHz SCS CCs is given by floor(3/5*44*Y1), and higher layers can configure these BDs for the CCs, subject to per-CC limit for the CC. The same principle applies for BD handling for the other CCs as well.

By way of example, the UE 100 reports the radio parameter Y1 for FR1 in the step 302. The UE 100 further reports the radio parameter Y2 for FR2 in the step 302.

For scheduling (e.g., in the step 404) CCx (x=1 to 3), which have 15 kHz SCS, the number of BDs is floor(3/5*44*Y1). For scheduling (e.g., in the step 404) CCx (x=4 to 5), which have 30 kHz SCS, the number of BDs is floor (2/5*36*Y1).

For scheduling (e.g., in the step 404) CCx (x=6 to 10), which have 120 kHz SCS, the number of BDs is 20*Y2.

Any of the aforementioned embodiments may be implemented according to the first class of embodiments. The second class of embodiments may be implemented independently or as an extension of the first class of embodiments, e.g., for handling BD and/or CCE for CA between FR1-carriers and FR2-carriers including cross-carrier scheduling or cross-carrier CA.

Additional enhancements can be considered for cross-carrier scheduling in the second class of embodiments. In cross-carrier scheduling, an embodiment of the UE 100 can be configured to monitor PDCCH for scheduling a first serving cell (e.g., one or more first CCs) in the control region in (or of) a second serving cell (e.g., one or more second CCs). The PDCCH transmitted on the second serving cell can include a carrier indicator field identifying the serving cell for which the DCI is addressed.

In an embodiment, the UE 100 reports a first pdcch-BlindDectionCA value (Y1) for a first frequency range and a second pdcch-BlindDectionCA value (Y2) for a second frequency range. The UE 100 is configured with a single cell group, and with a first number of carriers (N1) belonging to a first frequency range and a second number of carriers (N2) belonging to a second frequency range. The first frequency range can be FR1. The second frequency range can be FR2 (e.g., in the sense of 3GPP).

The UE 100 may be configured with cross-carrier scheduling—so denote n11, n12, n21, n22, as the number of carriers that have scheduling carrier and scheduled carrier in (FR1, FR1), (FR1, FR2), (FR2, FR1), and (FR2, FR2), respectively.

The embodiments can address all cases of CA scheduling including
(1) self-scheduling, and/or
(2) cross-carrier scheduling within same SCS and/or FR and/or across FRs.

Optionally in accordance with the first group embodiments, the reported capability is applied for a frequency range FRx to all scheduled cells that are scheduled from FRx (e.g., x=1 or 2).

In an embodiment, the PDCCH BDs and/or CCEs for scheduled carriers with a first numerology and with an associated scheduling carrier with a second numerology and scheduling carrier belonging to a first frequency range is based on
 first pdcch-BlindDectionCA value (Y1)
 first number of carriers that are schedulable from FR1 (n11+n12),
 and one or more of the following:
  numerology of the scheduled carrier
  numerology of the scheduling carrier
  per-CC non-CA BD limit based on at least one or more of the following:
   numerology of the scheduled carrier
   numerology of the scheduling carrier In the embodiment or in a further embodiment, the PDCCH BDs and/or CCEs for scheduled carriers with a first numerology and with an associated scheduling carrier with a second numerology and scheduling carrier belonging to a second frequency range is based on
 second pdcch-BlindDectionCA value (Y2)
 second number of carriers that are schedulable from FR1 (n21+n22),
 and one or more of the following:
  numerology of the scheduled carrier
  numerology of the scheduling carrier
  per-CC non-CA BD limit based on at least one or more of the following:
   numerology of the scheduled carrier
   numerology of the scheduling carrier Another embodiment, which is combinable with the aforementioned embodiments performs the method 300 as follows.

For cross-carrier scheduling with different numerologies, with BD and/or CCE capability Y for a frequency range,
 the limit of BDs and/or CCEs per slot of the scheduling CC (with numerology j) belonging to the frequency range for schedulable CC with numerology i is given by $(Q_i * M_i \text{ or } N_i)$, if $N_{cells}^{DL}$ is less than or equal to 4 or $N_{cells}^{DL}$ is less than or equal to Y,
 the limit of BDs/CCEs per slot of the scheduling CCs (with numerology j) belonging to the frequency range for schedulable CCs with numerology i is given by $$\left\lfloor Q_i * (M_i \text{ or } N_i) * \frac{X_{ij}}{N_{cells}^{DL}} * Y \right\rfloor,$$

if $N_{cells}^{DL}$ is greater than Y,
where
 $N_{cells}^{DL}$ is the number of configured CCs that are schedulable from that frequency range
 j is the numerology of the scheduling CC,
 i is the numerology of the scheduled CC,
 $M_i$ or $N_i$ denotes the limit of BDs/CCEs for non-CA case for numerology i,
 $X_{ij}$ is the number of CCs with numerology i that are schedulable from the scheduling CCs with numerology j
 $Q_i$ denotes a scaling factor that can be dependent on the scheduling carrier numerology and/or schedulable carrier numerology or independent of the scheduling and scheduling carrier numerolgoies
 $Q_i$ can be $$\frac{2^i}{2^j}$$

$Q_i$ can be 1
 $Q_i$ can be a value explicitly configured or specified in a specification.

Note that instead of $M_i$, $N_i$, the corresponding values from the scheduling cell can also be utilized.

For 3GPP Release 16, with cross-carrier scheduling and mixed numerology, this applies partitioning according to the numerology pair (i.e., the combination of scheduling CC numerology and scheduled CC numerology), with additional limits on per-numerology pair maximum BD/CCE limit, and a per-cell maximum BD/CCE limit.

The technique (e.g., the second class of embodiments) may be implemented as reflected by the below Text Proposal. The below Text Proposal may update the 3GPP document TS 38.213, version 15.4.0. More specifically, below Text Proposal can be applied for a future release of NR specification, where cross-carrier scheduling with mixed numerology is desirable. The below Text Proposal (e.g., each of the two portions) describes an implementation that can be introduced in a backward-compatible manner with the above Text Proposal (or each of the two portions of the above Text Proposal).

The below portion may update section 10.1 of the 3GPP document TS 38.213. The text proposal may be implemented to address the partitioning of BDs and/or CCEs based on reported capability (i.e., the radio parameter). An implementation of the below Text Proposal may support cross-carrier scheduling between carriers with mixed numerology.

Begin

If a UE is capable for operation with carrier aggregation with a maximum of 4 downlink cells for which the scheduling cells belong to a frequency range or indicates through pdcch-BlindDetectionCA a capability to monitor PDCCH candidates for $N_{cells}^{cap} \geq 4$ downlink cells for which the scheduling cells belong to a frequency range, and is configured with $N_{cells}^{DL,\mu}$ downlink cells that are schedulable from scheduling cells in the frequency range with DL BWPs having SCS configuration µ where $$\sum_{\mu=0}^{3} N_{cells}^{DL,\mu} \leq 4 \text{ or } \sum_{\mu=0}^{3} N_{cells}^{DL,\mu} \leq N_{cells}^{cap},$$

respectively, the UE is not required to monitor, on the active DL BWP of the scheduling cell with numerology k for the frequency range, more than $$M_{PDCCH}^{total,slot,\mu} = \frac{2^{\mu}}{2^{k}} * M_{PDCCH}^{max,slot,\mu}$$

PDCCH candidates or more than $$C_{PDCCH}^{total,slot,\mu} = \frac{2^{\mu}}{2^{k}} * C_{PDCCH}^{max,slot,\mu}$$

non-overlapped CCEs per slot for each scheduled cell.

If a UE indicates through pdcch-BlindDetectionCA a capability to monitor PDCCH candidates for $N_{cells}^{cap} \geq 4$ downlink cells for which the scheduling cells belong to a frequency range, and is configured with $N_{cells}^{DL,\mu}$ downlink cells that are schedulable from scheduling cells in the frequency range with DL BWPs having SCS configuration µ, where $\Sigma_{\mu=0}^{3} N_{cells}^{DL,\mu} \times N_{cells}^{cap}$, a DL BWP of an activated cell is the active DL BWP of the activated cell, and a DL BWP of a deactivated cell is the DL BWP with index provided by firstActiveDownlinkBWP-Id for the deactivated cell the UE is not required to monitor for the frequency range more than $$M_{PDCCH}^{total,slot,\mu} = \left\lfloor \frac{2^{\mu}}{2^{k}} * N_{cells}^{cap} \cdot M_{PDCCH}^{max,slot,\mu} \cdot N_{cells}^{DL,\mu} \bigg/ \sum_{j=0}^{3} N_{cells}^{DL,j} \right\rfloor$$

PDCCH candidates or more than $$C_{PDCCH}^{total,slot,\mu} = \left\lfloor \frac{2^{\mu}}{2^{k}} * N_{cells}^{cap} \cdot C_{PDCCH}^{max,slot,\mu} \cdot N_{cells}^{DL,\mu} \bigg/ \sum_{j=0}^{3} N_{cells}^{DL,j} \right\rfloor$$

non-overlapped CCEs per slot on the active DL BWP(s) of scheduling cell(s) with numerology k from the $N_{cells}^{DL,\mu,k}$ downlink cells that are schedulable cells with numerology µ from scheduling cell(s) with numerology k.

End

Alternatively or in addition, the below portion may update section 10.1 of the 3GPP document TS 38.213. The Text Proposal may be implemented to address a maximum number of buffered DCI based on the reported capability (i.e., the radio parameter).

Begin

If a UE indicates through pdcch-BlindDetectionCA a capability to monitor PDCCH candidates for $N_{cells}^{cap} \geq 4$ downlink cells for a frequency range and the UE is configured with $N_{cells}^{DL} > 4$ downlink cells that are schedulable from scheduling cells in the frequency range or $N_{cells}^{UL} > 4$ uplink cells that are schedulable from scheduling cells in the frequency range, the UE expects to have respectively received at most $16 \cdot N_{cells}^{cap}$ PDCCHs for DCI formats 1_0 or 1_1 with CRC scrambled by a C-RNTI, or a CS-RNTI, or a MCS-RNTI scheduling $16 \cdot N_{cells}^{cap}$ PDSCH receptions for which the UE has not received any corresponding PDSCH symbol over all $N_{cells}^{DL}$ downlink cells schedulable from scheduling cells in the frequency range DCI formats 0_0 or 0_1 with CRC scrambled by a C-RNTI, or a CS-RNTI, or a MCS-RNTI scheduling $16 \cdot N_{cells}^{cap}$ PUSCH transmissions for which the UE has not transmitted any corresponding PUSCH symbol over all $N_{cells}^{UL}$ uplink cells schedulable from scheduling cells in the frequency range End An example (e.g. based on above Text Proposal) is schematically illustrated in FIG. 7A, wherein an embodiment of the UE 100 is configured with five CCs in FR1 (e.g., three CCs with 15 kHz SCS and two CCs with 30 kHz SCS) and five CCs in FR2 (e.g., with 120 kHz SCS). Furthermore, one CC in FR2 is scheduled from a CC in FR1.

Q, e.g. the scaling factor, can be 1, or Q can be $2^4/2^1=8$. Preferably, the number of control channels to be monitored (e.g., the number of BDs) is per-slot of the scheduling cell (or scheduling CC).

More specifically, the UE 100 reports Y1 for FR1 and Y2 for FR2 in the step 302. For scheduling (e.g., in the step 404) CCx (x=1 to 3), which have 15 kHz SCS, the number of BDs is floor(3/6*44*Y1). For scheduling (e.g., in the step 404) CCx (x=4 to 5), which have 30 kHz SCS, the number of BDs is floor(2/6*36*Y1). For scheduling (e.g., in the step 404) CC6, which has 120 kHz SCS, the number of BDs is floor(1/6*(Q*20)*Y1). For scheduling (e.g., in the step 404) CCx (x=7 to 10), the number of BDs is 20*Y2.

Figure 7B:
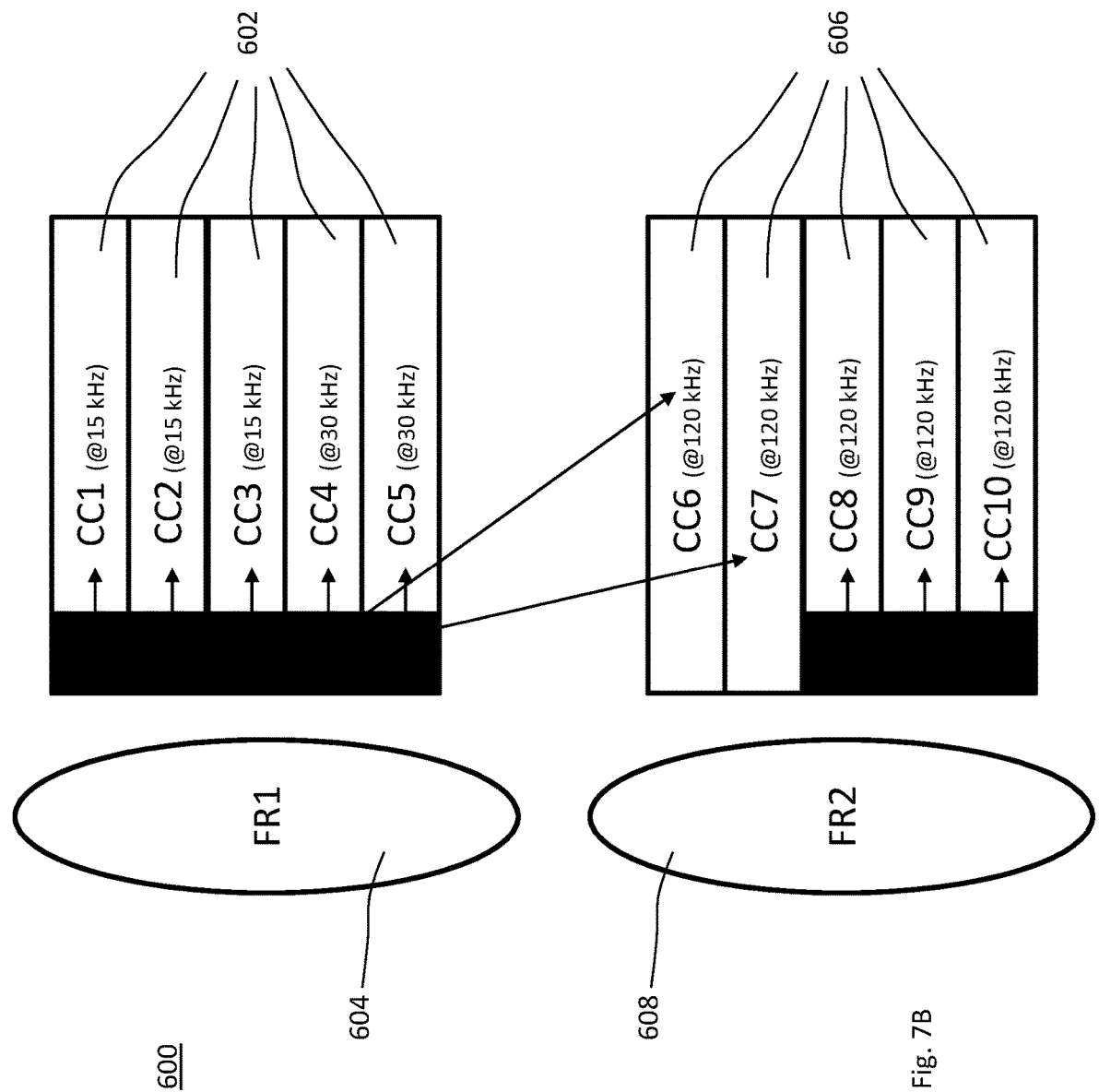
FIG. 7B schematically illustrates a third example for a carrier aggregation of component carriers in different frequency ranges using different numerologies.

Another example is schematically illustrated in FIG. 7B. In this case, there are two carriers (e.g., CC6 and CC7) that are cross-carrier scheduled from (CC4 and CC5). The BD split is shown in the FIG. 7B, indicating that the CC6, CC7 belong to the numerology pair (i.e the combination of scheduling cell numerology and scheduled cell numerology) given by the SCS pair of 30 kHz and 120 kHz.

More specifically, the UE 100 reports Y1 for FR1 and Y2 for FR2 in the step 302. To schedule (e.g., in the step 404) CCx (x=1 to 3), the number of BDs per 1 ms slot is equal to floor(3/7*44*Y1). To schedule (e.g., in the step 404) CCx (x=4 to 5), the number of BDs per 0.5 ms slot is equal to floor(2/7*36*Y1). To schedule (e.g., in the step 404) CC6 and CC7, the number of BDs per 0.5 ms slot is equal to floor(2/7*(4*20)*Y1). To schedule (e.g., in the step 404) CCx (x=8 to 10), the number of BDs per 0.125 ms slot is equal to 20*3.

Any embodiment of the technique may, as such or in combination with the embodiments described above or in combination with below list of embodiments, use a frequency range in determining the number of control channels to be monitored for a given CC, e.g., the partitioned number of PDCCH BDs and/or CCEs (which is also referred to as partitioning or budgeting) in case of carrier aggregation.

Any feature described for determining the number of monitored control channels may also be applied for budgeting the maximum number of buffered DCIS.

A first class of embodiments may perform CA between FR1-carriers and FR2-carriers, wherein the reported capability for FR1 is applied to aggregated FR1 carriers only, and/or wherein the reported capability for FR2 is applied to aggregated FR2 carriers only.

A second class of embodiments may perform CA between FR1-carriers and FR2-carriers and cross-carrier scheduling with mixed numerology, including between FR1 and FR2 carriers, wherein the reported capability for FR1 is applied to all configured carriers that are schedulable from scheduling carriers in FR1, and/or wherein the reported capability for FR2 is applied to all configured carriers that are schedulable from scheduling carriers in FR2

Figure 8:
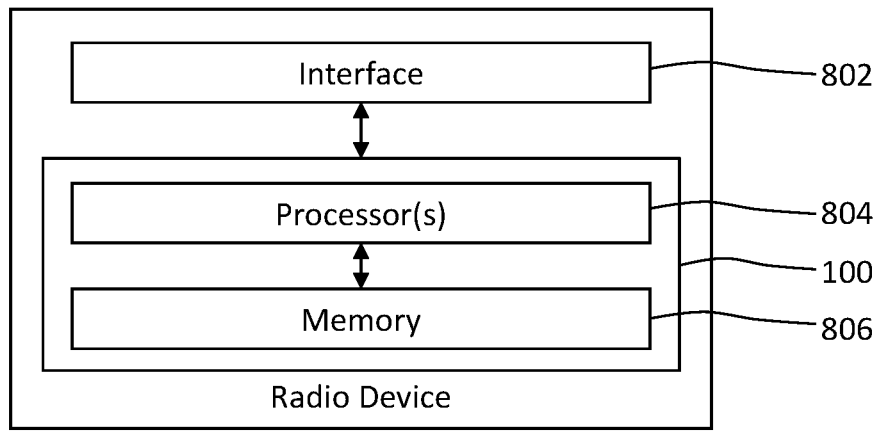
FIG. 8 shows a schematic block diagram of a radio device embodying the device of FIG. 1.

FIG. 8 shows a schematic block diagram for an embodiment of the device 100. The device 100 comprises one or more processors 804 for performing the method 300 and memory 806 coupled to the processors 804. For example, the memory 806 may be encoded with instructions that implement at least one of the modules 102 and 104.

The one or more processors 804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 806, radio device or UE functionality. For example, the one or more processors 804 may execute instructions stored in the memory 806. Such functionality may include providing various features and steps discussed herein, including any of the benefits disclosed herein. The expression "the device being operative to perform an action" may denote the device 100 being configured to perform the action.

As schematically illustrated in FIG. 8, the device 100 may be embodied by a radio device 800, e.g., functioning as a UE. The radio device 800 comprises a radio interface 802 coupled to the device 100 for radio communication, e.g., with one or more base stations 200 in downlinks and/or uplinks and/or with further embodiments of the radio device 800 in sidelinks.

Figure 9:
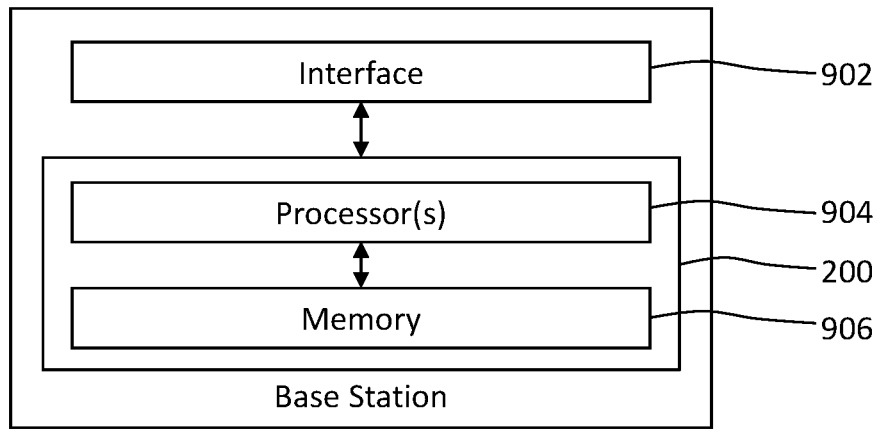
FIG. 9 shows a schematic block diagram of a base station embodying the device of FIG. 2.

FIG. 9 shows a schematic block diagram for an embodiment of the device 200. The device 200 comprises one or more processors 904 for performing the method 400 and memory 906 coupled to the processors 904. For example, the memory 906 may be encoded with instructions that implement at least one of the modules 202 and 204.

The one or more processors 904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 906, base station or gNB functionality. For example, the one or more processors 904 may execute instructions stored in the memory 906. Such functionality may include providing various features and steps discussed herein, including any of the benefits disclosed herein. The expression "the device being operative to perform an action" may denote the device 200 being configured to perform the action.

As schematically illustrated in FIG. 9, the device 200 may be embodied by a base station 900, e.g., functioning as a gNB. The base station 900 comprises a radio interface 902 coupled to the device 200 for radio communication, e.g., with one or more radio devices 100 or further embodiments of the base station 900.

Figure 10:
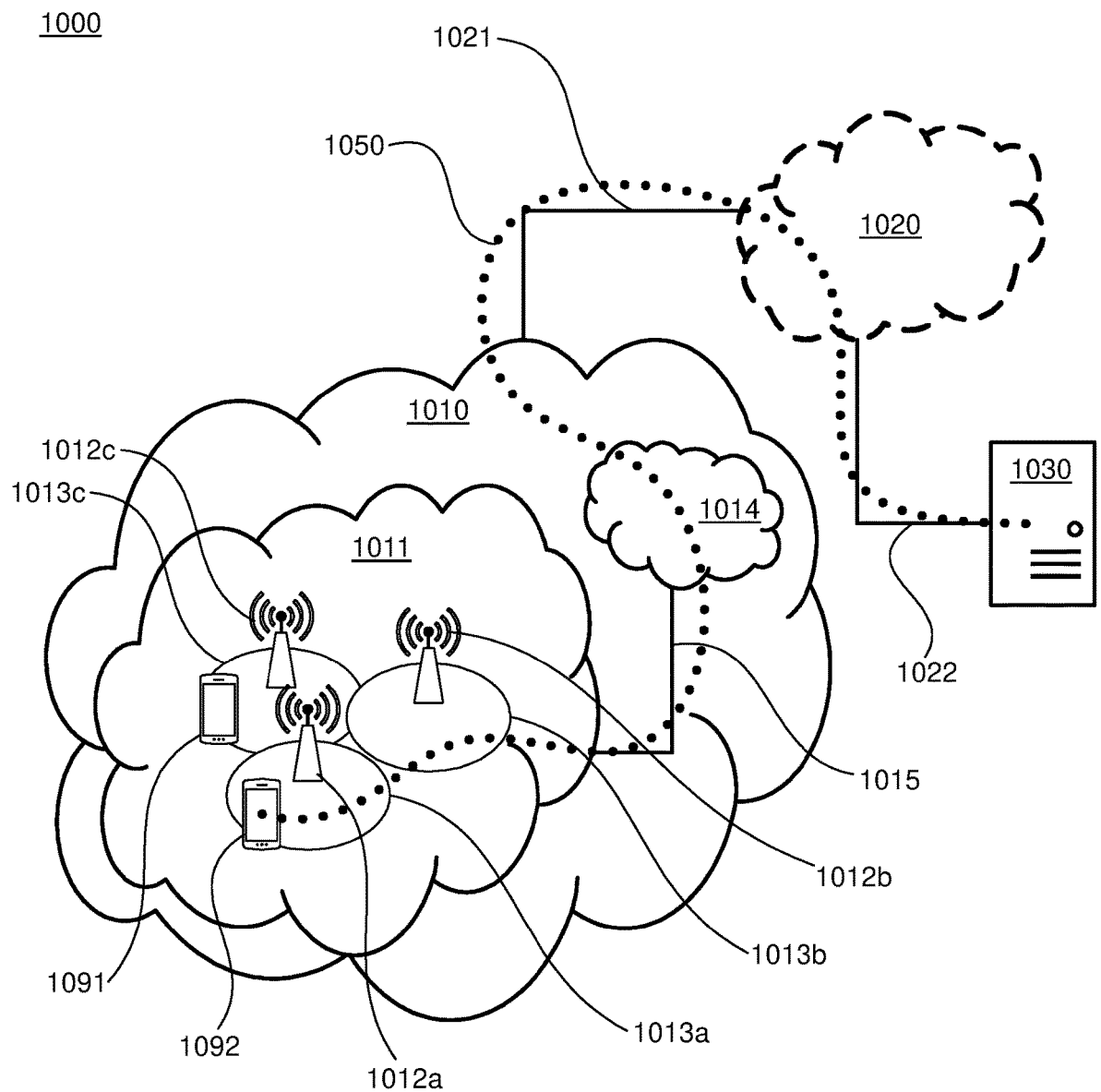
FIG. 10 schematically illustrates an example telecommunication network connected via an intermediate network to a host computer.

With reference to FIG. 10, in accordance with an embodiment, a communication system 1000 includes a telecommunication network 1010, such as a 3GPP-type cellular network, which comprises an access network 1011, such as a radio access network, and a core network 1014. The access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to the core network 1014 over a wired or wireless connection 1015. A first user equipment (UE) 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Any of the base stations 1012 and the UEs 1091, 1092 may embody the device 200.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider, or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 1020 may be one of, or a combination of more than one of, a public, private or hosted network; the intermediate network 1020, if any, may be a backbone network or the Internet; in particular, the intermediate network 1020 may comprise two or more sub-networks (not shown).

The communication system 1000 of FIG. 10 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signalling via the OTT connection 1050, using the access network 1011, the core network 1014, any intermediate network 1020 and possible further infrastructure (not shown) as intermediaries. The OTT connection 1050 may be transparent in the sense that the participating communication devices through which the OTT connection 1050 passes are unaware of routing of uplink and downlink communications. For example, a base station 1012 need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

By virtue of the method 200 being performed by any one of the base stations 1012, the performance of the OTT connection 1050 can be improved, e.g., in terms of increased throughput and/or reduced latency.

Example implementations, in accordance with an embodiment of the UE, base station and host computer discussed in the preceding paragraphs, will now be described with reference to FIG. 11. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data, which is transmitted using the OTT connection 1150. The user data may depend on the location of the UE 1130. The user data may comprise auxiliary information or precision advertisements (also: ads) delivered to the UE 1130. The location may be reported by the UE 1130 to the host computer, e.g., using the OTT connection 1150, and/or by the base station 1120, e.g., using a connection 1160.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 11) served by the base station 1120. The communication interface 1126 may be configured to facilitate a connection 1160 to the host computer 1110. The connection 1160 may be direct, or it may pass through a core network (not shown in FIG. 11) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station 1120 further has software 1121 stored internally or accessible via an external connection.

The communication system 1100 further includes the UE 1130 already referred to. Its hardware 1135 may include a radio interface 1137 configured to set up and maintain a wireless connection 1170 with a base station serving a coverage area in which the UE 1130 is currently located. The hardware 1135 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1132. The client application 1132 may be operable to provide a service to a human or non-human user via the UE 1130, with the support of the host computer 1110. In the host computer 1110, an executing host application 1112 may communicate with the executing client application 1132 via the OTT connection 1150 terminating at the UE 1130 and the host computer 1110. In providing the service to the user, the client application 1132 may receive request data from the host application 1112 and provide user data in response to the request data. The OTT connection 1150 may transfer both the request data and the user data. The client application 1132 may interact with the user to generate the user data that it provides.

Figure 11:
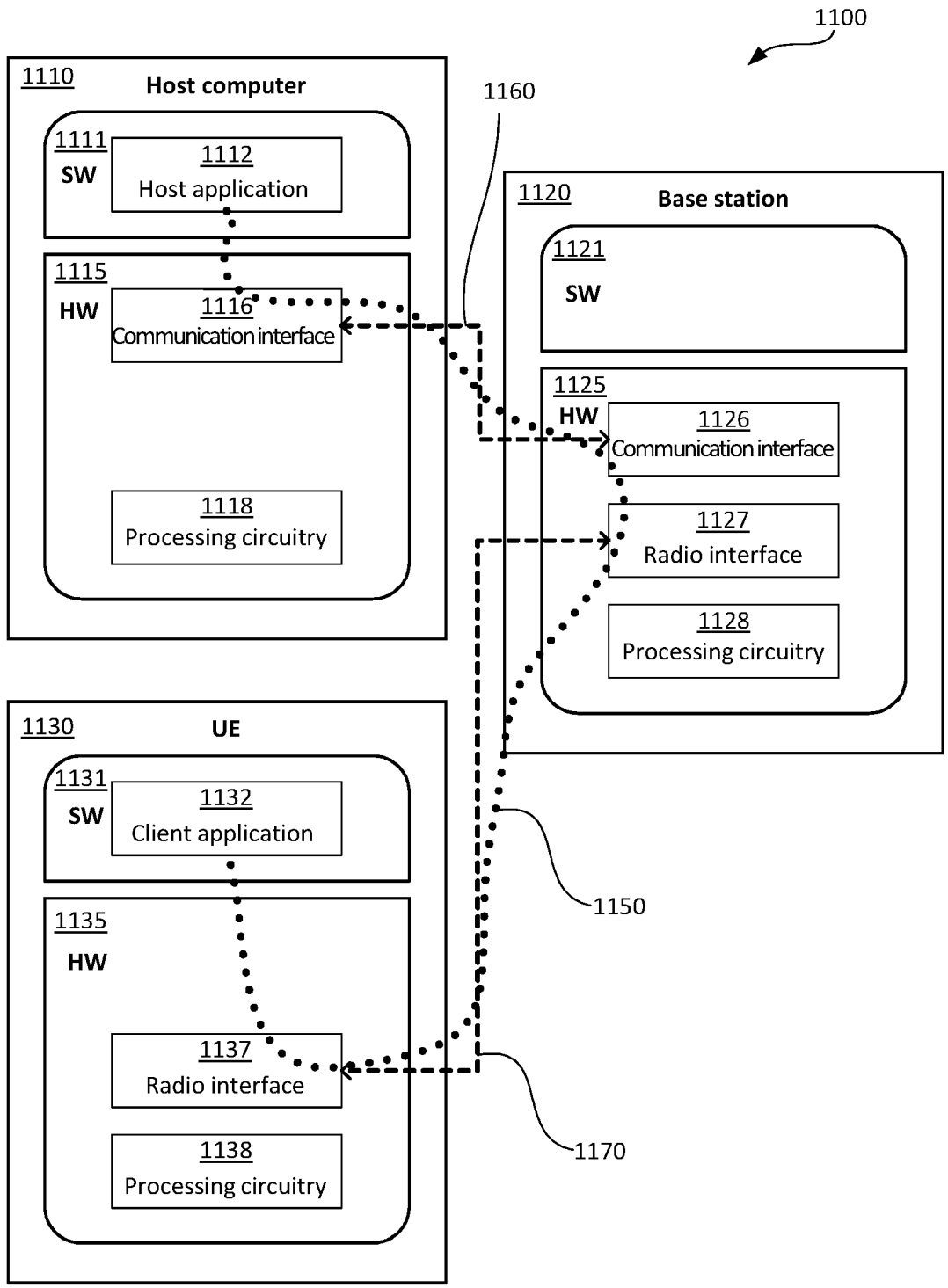
FIG. 11 shows a generalized block diagram of a host computer communicating via a base station or radio device functioning as a gateway with a user equipment over a partially wireless connection.

It is noted that the host computer 1110, base station 1120 and UE 1130 illustrated in FIG. 11 may be identical to the host computer 1030, one of the base stations 1012a, 1012b, 1012c and one of the UEs 1091, 1092 of FIG. 10, respectively. This is to say, the inner workings of these entities may be as shown in FIG. 11, and, independently, the surrounding network topology may be that of FIG. 10.

In FIG. 11, the OTT connection 1150 has been drawn abstractly to illustrate the communication between the host computer 1110 and the UE 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network).

The wireless connection 1170 between the UE 1130 and the base station 1120 is in accordance with the teachings of the embodiments described throughout this disclosure. One or more of the various embodiments improve the performance of OTT services provided to the UE 1130 using the OTT connection 1150, in which the wireless connection 1170 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signalling facilitating the host computer's 1110 measurements of throughput, propagation times, latency and the like. The measurements may be implemented in that the software 1111, 1131 causes messages to be transmitted, in particular empty or "dummy" messages, using the OTT connection 1150 while it monitors propagation times, errors etc.

Figures 12, 13:
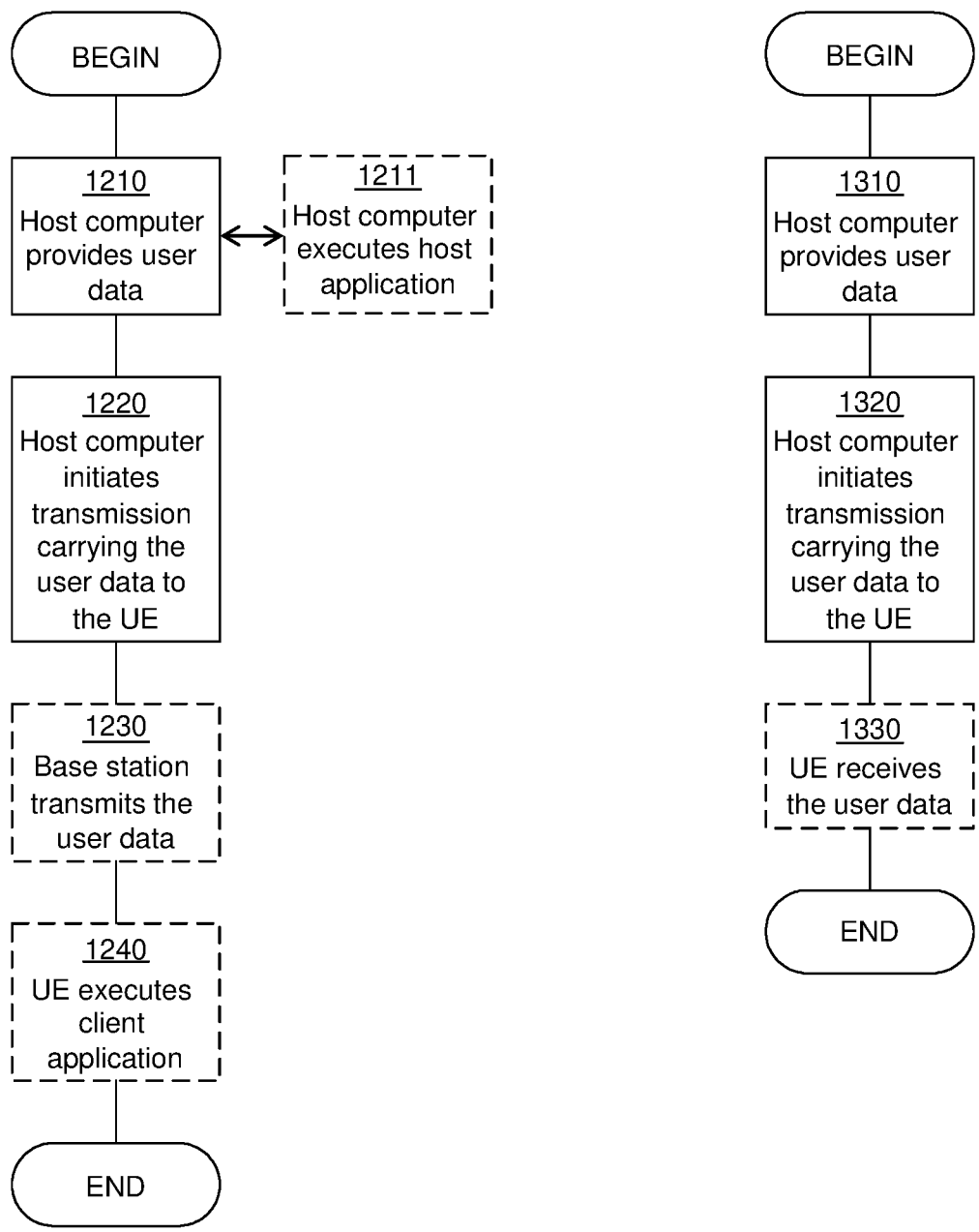
FIGS. 12 and 13 show flowcharts for methods implemented in a communication system including a host computer, a base station and a user equipment.

FIG. 12 is a flowchart illustrating a method implemented in a communication system, in accordance with one embodiment. The communication system includes a host computer, a base station and a UE, which may be those described with reference to FIGS. 10 and 11. For simplicity of the present disclosure, only drawing references to FIG. 12 will be included in this paragraph. In a first step 1210 of the method, the host computer provides user data. In an optional substep 1211 of the first step 1210, the host computer provides the user data by executing a host application. In a second step 1220, the host computer initiates a transmission carrying the user data to the UE. In an optional third step 1230, the base station transmits to the UE the user data, which was carried in the transmission that the host computer initiated, in accordance with the teachings of the embodiments described throughout this disclosure. In an optional fourth step 1240, the UE executes a client application associated with the host application executed by the host computer.

FIG. 13 is a flowchart illustrating a method implemented in a communication system, in accordance with one embodiment. The communication system includes a host computer, a base station and a UE, which may be those described with reference to FIGS. 10 and 11. For simplicity of the present disclosure, only drawing references to FIG. 13 will be included in this paragraph. In a first step 1310 of the method, the host computer provides user data. In an optional substep (not shown) the host computer provides the user data by executing a host application. In a second step 1320, the host computer initiates a transmission carrying the user data to the UE. The transmission may pass via the base station, in accordance with the teachings of the embodiments described throughout this disclosure. In an optional third step 1330, the UE receives the user data carried in the transmission.

As has become apparent from above description, embodiments of the technique can accommodate complexity constraints at a radio device (e.g., a UE) as per capabilities for different frequency ranges, e.g., FR1 and FR2, reported by the radio device. Same or further embodiments of the technique can ensure a proper operation of the radio device (e.g., a UE) for at least one of the following cases: CA between CCs in FR1 and FR2, optionally including self-scheduling and/or cross-carrier scheduling.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention may be limited (e.g., only) by the scope of the claims.

The invention claimed is:

1. A method of monitoring control channels on component carriers (CCs) in at least two different frequency ranges (FRs) by a radio device, the method comprising:
   transmitting radio parameters that are, for each of the at least two FRs, indicative of a capability of the radio device of monitoring a number of control channels on each of the CCs; and
   monitoring, in each of the at least two FRs, the number of control channels on each of the CCs according to the indicated capability.

2. The method of claim 1, wherein the radio device transmits respective radio parameters for the respective FRs.

3. The method of claim 2, further comprising determining the number of control channels monitored on each of the CCs separately or independently for the respective FRs according to the indicated capability based on the respective radio parameters for the respective FRs.

4. The method of claim 1, wherein the number of control channels monitored on each of the CCs according to the indicated capability comprises a tabulated number of control channels for each of the CCs configured for the radio device when a number of CCs configured for the radio device is equal to or less than a number of CCs indicated by the radio parameters for the respective FRs.

5. The method of claim 4, wherein the tabulated number of control channels for the respective CCs depends on respective numerologies of the respective CCs.

6. The method of claim 1, wherein the number of control channels monitored on each of the CCs according to the indicated capability comprises a partitioned number of control channels for each of the CCs configured for the radio device when the number of configured CCs is greater than a number of CCs indicated by the radio parameters for the respective FRs.

7. The method of claim 6, wherein the partitioned number is a function of at least one of a tabulated number of control channels for the respective CC and the number of CCs indicated by the radio parameters for the respective FRs.

8. The method of claim 7, wherein the partitioned number of control channels for the respective CCs is equal to or less than the tabulated number of control channels for the respective CCs.

9. The method of claim 7, wherein the partitioned number, $N^{total,k,\mu}$ of control channels for each of the CCs with numerology u in the FR k is $$N^{total,k,\mu} = \text{floor}(Y^k \cdot N^{max,\mu} \cdot X^\mu / X),$$

wherein a number of configured CCs with numerology $\mu$ is $X^\mu$, the number of CCs configured for the radio device is the sum $X = \Sigma_\mu X^\mu$, the number of CCs indicated by the radio parameters for FR k is $Y^k$, and the tabulated number of control channels for each of the CCs with numerology $\mu$ is $N^{max,\mu}$.

10. The method of claim 1, wherein the control channels comprise physical downlink control channel (PDCCH) candidates, and wherein monitoring the number of control channels on each of the CCs comprises monitoring the number of PDCCH candidates on each of the CCs.

11. The method of claim 10, wherein monitoring the number of PDCCH candidates comprises performing blind decoding (BD) on the respective PDCCH candidates.

12. The method of claim 1, wherein the control channels comprise non-overlapped control channel elements (CCEs) and wherein monitoring the number of control channels on each of the CCs comprises monitoring the number of non-overlapped CCEs on each of the CCs.

13. The method of claim 1, wherein at least one of the control channels comprise downlink control information (DCI) for the radio device, and the method further comprises:
buffering a number of DCIs received on the at least one control channel in the respective FRs depending on the radio parameter for the respective one of the FRs.

14. The method of claim 1, wherein CCs in a first one of the FRs are aggregated in a first carrier aggregation (CA) and CCs in a second one of the FRs are aggregated in a second CA different than the first CA.

15. The method of claim 14, wherein the number of control channels to be monitored on each of the CCs in the first and second FRs is determined according to the capability indicated by the radio parameters for the respective first and second FRs.

16. The method of claim 1, wherein the CCs in a first one of the FRs and the CCs in a second one of the FRs are aggregated in a carrier aggregation (CA), and the method further comprises:
deriving a single parameter from a first one of the radio parameters that corresponds to the first FR and from a second one of the radio parameter that corresponds to the second FR; and
determining the number of control channels on each of the CCs in both the first FR and the second FR based on a capability indicated by the single parameter.

17. The method of claim 16, wherein the single parameter is one of the following functions of the first and second radio parameters: a minimum of the first and second radio parameters, a maximum of the first and second radio parameters, a sum of the first and second radio parameters, and an average of the first and second radio parameters.

18. The method of claim 1, wherein the CCs in a first one of the FRs and the CCs in a second one of the FRs are aggregated in a carrier aggregation (CA), and the method further comprises:
responsive to a transmission of a first one of the radio parameters that corresponds to the first FR and a second one of the radio parameter that corresponds to the second FR and has a different value than the first radio parameter, receiving a control message indicative of a request for changing at least one of the first and second radio parameters such that the first and second radio parameters have a same value.

19. The method of claim 1, wherein CCs on a first one of the FRs comprise a Master Cell Group (MCG) for the radio device and CCs on a second one of the FRs comprise a Secondary Cell Group (SCG) for the radio device.

20. The method of claim 1, wherein the CCs are aggregated with cross-carrier scheduling, and wherein the number of control channels to be monitored depends on a combination of a numerology of a scheduling CC and a numerology of a scheduled CC.

21. A method of transmitting control channels on component carriers (CCs) in at least two different frequency ranges (FRs) to a radio device, the method comprising:
receiving, from the radio device, radio parameters that are, for each of the at least two FRs, indicative of a capability of the radio device of monitoring a number of control channels on each of the CCs; and
transmitting control information to the radio device in each of the at least two FRs using the number of control channels on each of the CCs according to the indicated capability.

22. The method of claim 21, further comprising determining the number of control channels transmitted on each of the CCs separately or independently for the respective FRs according to the indicated capability based on the respective radio parameters indicative of the respective capabilities of the radio device for the respective FRs.

23. A radio device configured to monitor control channels on component carriers (CCs) in at least two different frequency ranges (FRs), the radio device comprising:
at least one processor; and
a memory, said memory comprising instructions executable by said at least one processor to cause the radio device to:
transmit radio parameters that are, for each of the at least two FRs, indicative of a capability of the radio device of monitoring a number of control channels on each of the CCs; and
monitor, in each of the at least two FRs, the number of control channels on each of the CCs according to the indicated capability.

24. The device of claim 23, wherein the instructions further cause the radio device to determine the number of control channels monitored on each of the CCs separately or independently for the respective FRs according to the indicated capability based on the respective radio parameters for the respective FRs.

25. A device configured to transmit control channels on component carriers (CCs), in at least two different frequency ranges (FRs) to a radio device, the device comprising:
at least one processor; and
a memory, said memory comprising instructions executable by said at least one processor to cause the device to:
receive, from the radio device, radio parameters that are, for each of the at least two FRs, indicative of a capability of the radio device of monitoring a number of control channels on each of the CCs; and
transmit control information to the radio device in each of the at least two FRs using the number of control channels on each of the CCs according to the indicated capability.

26. The device of claim 25, wherein the instructions further cause the device to determine the number of control channels transmitted on each of the CCs separately or independently for the respective FRs according to the indicated capability based on the respective radio parameter transmitted by the radio device for the respective FRs.

* * * * *